(12) United States Patent
Jee et al.

(10) Patent No.: US 9,855,985 B2
(45) Date of Patent: Jan. 2, 2018

(54) ENDLESS TRACK TREAD PATTERN

(71) Applicant: SRJ, Inc., Schaumburg, IL (US)

(72) Inventors: Woo Young Jee, Inverness, IL (US); Dennis H. Jee, Schaumburg, IL (US); Jay Lee, Schaumberg, IL (US)

(73) Assignee: SRJ, Inc., Schaumburg, IL (US)

( * ) Notice: Subject to any disclaimer, the term of this patent is extended or adjusted under 35 U.S.C. 154(b) by 106 days.

(21) Appl. No.: 14/736,632

(22) Filed: Jun. 11, 2015

(65) Prior Publication Data

US 2016/0362151 A1 Dec. 15, 2016

(51) Int. Cl.
*B62D 55/24* (2006.01)
*B62D 55/26* (2006.01)

(52) U.S. Cl.
CPC .......... *B62D 55/244* (2013.01); *B62D 55/26* (2013.01)

(58) Field of Classification Search
CPC ....... B62D 55/24; B62D 55/244; B62D 55/26
USPC ................. 305/165, 167, 169–171, 176–177
See application file for complete search history.

(56) References Cited

U.S. PATENT DOCUMENTS

| | | | |
|---|---|---|---|
| 5,380,076 A * | 1/1995 | Hori | B62D 55/244 305/171 |
| 6,352,320 B1 | 3/2002 | Bonko et al. | |
| 7,533,945 B2 | 5/2009 | Jee et al. | |
| 7,547,079 B2 | 6/2009 | Choi | |
| 7,866,767 B2 | 1/2011 | Lemaire et al. | |
| 2003/0209942 A1 | 11/2003 | Deland et al. | |
| 2008/0211301 A1 | 9/2008 | Jee et al. | |
| 2012/0139334 A1 | 6/2012 | Pringiers | |

FOREIGN PATENT DOCUMENTS

| | | |
|---|---|---|
| JP | H04271978 A | 9/1992 |
| WO | 2014138931 A1 | 9/2014 |

OTHER PUBLICATIONS

"4 Different styles of Bobcat Skidsteer Rubber Tracks," Summit Supply LLC, posted Nov. 29, 2012 on http://info.summitrubbertracks.com/blog/bid/184533/4-different-styles-of-Bobcat-Skidsteer-Rubber-Tracks, 5 pp.
"Rubber Track Patterns," Global Track Warehouse, retrieved on Jul. 8, 2014, from http://www.gtwusa.net/patterns.html, 1 pp.

(Continued)

*Primary Examiner* — Jason R Bellinger
(74) *Attorney, Agent, or Firm* — Shumaker & Sieffert, P.A.

(57) ABSTRACT

A tread pattern for a vehicle track, such as an endless track for earth moving equipment, comprises a plurality of blocks. Each block includes two lateral traction portions extending from a center traction portion in substantially opposite directions. The two lateral traction portions are longitudinally aligned. In some examples, each lateral traction portion may define a T-shape. For example, the lateral traction portions of each block may define a protrusion to define the "T" shape, and, in some examples, the protrusions may extend in opposite longitudinal directions. In some examples, the lateral traction portions of each block may be the same shape, where one lateral traction portion may be oriented at about 180 degrees relative to the other lateral traction portion.

21 Claims, 12 Drawing Sheets

(56) References Cited

OTHER PUBLICATIONS

"Item #180-72-39, Excavator Rubber Track," Romac Industrial Parts, retrieved on Jul. 8, 2014 from http://catalog.romacparts.com/item/all-categories-rubber-tracks/egories-rubber-tracks-takeushi-style-rubber-tracks/180-72-39-4?, 1 pp.

"Item #230-96-35, Excavator Rubber Track," Romac Industrial Parts, retrieved on Jul. 8, 2014 from http://catalog.romacparts.com/item/all-categories-rubber-tracks/egories-rubber-tracks-takeushi-style-rubber-tracks/230-96-35-3?, pp.

"Nighthawk DURA-CORE™ Rubber Track," Tough & Reliable. Rubber Tracks from Nighthawk, retrieved on Jul. 8, 2014 from http://www.nighthawktires.com/tracks.html, 4 pp.

"DitchWitch SK650," RubberTrax, retrieved on Jul. 8, 2014, from http://www.rubbertrax.com/model-details.asp?model=sk650, 3 pp.

"Rubber Tracks," Wilson-Finley, retrieved on Jul. 8, 2014, from http://www.wilsonfinleyparts.com/rubber-tracks.php, 2 pp.

"TRT-900 Rubber Tracks," ForConstructionPros.com, retrieved on Jul. 8, 2014, from http://www.forconstructionpros.com/product/10166179/trelleborg-wheel-systems-americas-inc-trt-900-rubber-tracks, 6 pp.

"Rubber Tracks for Track Loaders," BridgeStone, accessed on Jan. 9, 2015, 6 pp.

International Search Report and Written Opinion from counterpart International Application No. PCT/US2016/035244, dated Sep. 12, 2016, 17 pp.

Response to the Written Opinion dated Sep. 12, 2016, from counterpart International Application No. PCT/US2016/035244, filed on Jan. 26, 2017, 9 pp.

International Preliminary Report on Patentability from International Application No. PCT/US2016/035244, dated Sep. 25, 2017, 13 pp.

\* cited by examiner

ENDLESS TRACK TREAD PATTERN

TECHNICAL FIELD

The disclosure relates to a track for a vehicle, and more particularly, to a tread design for a vehicle track.

BACKGROUND

Many off-road vehicles, such as earthmoving vehicles (e.g., excavators, skid steer track loaders or multi-terrain track loaders) and agricultural vehicles, include an endless track coupled to a drive system, which may include, for example, one or more drive sprockets. An endless track may provide traction on surfaces that traditional wheels having a circular cross-section may not be able to adequately grip. For example, a vehicle with an endless track may bridge a greater surface area than a vehicle with two or more circular wheels, which may enable the vehicle with the endless track to transverse surfaces that the vehicle with circular wheels would not ordinarily be able to transverse, such as uneven or loose surfaces (e.g., gravel or mud).

In some cases, an endless track is formed of metal, rubber, such as a molded rubber, or a combination of metal and rubber. The endless track may be molded as a single, integral piece or an assembly of interconnected parts that are coupled together to define an endless track. The endless track can include a body with a first, interior side that engages with a drive system and a second, exterior side that defines a tread pattern.

SUMMARY

In general, the disclosure is directed to a tread pattern for a vehicle track, such as an endless track. A tread pattern described herein comprises a plurality of blocks that protrude from a common surface and define a ground contact surface of the track. Each block includes two lateral traction portions extending from a center traction portion in substantially opposite directions. The two lateral traction portions are longitudinally aligned. In some examples, each lateral traction portion may define a T-shape (e.g., a shape resembling the letter "T"), which may or may not be symmetrical. For example, each lateral traction portion of a block may define a protrusion to define the "T" shape, and, in some examples, the protrusions may extend in opposite longitudinal directions. In some examples, the lateral traction portions of each block may be the same shape, where one lateral traction portion may be oriented at about 180 degrees relative to the other lateral traction portion. In other examples, each of the lateral traction portions of each block may also define a recess, which may face opposite longitudinal directions.

In some examples, the blocks may be longitudinally spaced around the endless track such that the "T" pattern substantially uniformly repeats around the circumference of an endless track. In some examples, adjacent blocks may circumferentially be aligned or overlap with each other to provide a substantially continuous ground contact surface. In some examples, the generally T shape of each lateral traction portion may provide substantially equal traction power in both forward and reverse movements of the endless track.

In one example, the disclosure is directed to a vehicle track comprising a first side configured to mount to a drive system of a vehicle, and a second side opposite the first side and defining a tread pattern. The tread pattern comprises a first block and a second block. The first block comprises a first central portion, a first lateral portion laterally offset from the first central portion, a second lateral portion laterally offset from both the first central portion and the first lateral portion, wherein the first central portion connects the first and second lateral portions, and wherein the first and second lateral portions are longitudinally aligned. The second block longitudinally offset from the first block comprises a second central portion substantially laterally aligned with the first central portion, a third lateral portion laterally offset from the second central portion, and substantially laterally aligned with the first lateral portion, and a fourth lateral portion laterally offset from the second central portion, and substantially laterally aligned with the second lateral portion, wherein the second central portion connects the third and fourth lateral portions, wherein the third and fourth lateral portions are longitudinally aligned, and wherein the first lateral portion and the fourth lateral portion overlap or align in a longitudinal direction.

In another example, the disclosure is directed to a system comprising a drive sprocket, and an endless track coupled to the drive sprocket and defining a tread pattern. The tread pattern comprises a first block and a second block. The first block comprises a first central portion, a first lateral portion laterally offset from the first central portion, a second lateral portion laterally offset from both the first central portion and the first lateral portion, wherein the first central portion connects the first and second lateral portions, and wherein the first and second lateral portions are longitudinally aligned. The second block longitudinally offset from the first block comprises a second central portion substantially laterally aligned with the first central portion, a third lateral portion laterally offset from the second central portion, and substantially laterally aligned with the first lateral portion, and a fourth lateral portion laterally offset from the second central portion, and substantially laterally aligned with the second lateral portion, wherein the second central portion connects the third and fourth lateral portions, wherein the third and fourth lateral portions are longitudinally aligned, and wherein the first lateral portion and the fourth lateral portion overlap or align in a longitudinal direction.

In another example, the disclosure is directed to a vehicle track comprising a first side configured to mount to a drive system of a vehicle, and a second side opposite the first side and defining a tread pattern. The tread pattern comprises a first block and a second block. The first block comprises a first central portion, a first lateral portion laterally offset from the first central portion, a second lateral portion laterally offset from both the first central portion and the first lateral portion, wherein the first central portion connects the first and second lateral portions, and wherein the first and second lateral portions each define a ground contact surface that defines a generally T shape. The second block longitudinally offset from the first block comprises a second central portion substantially laterally aligned with the first central portion, a third lateral portion laterally offset from the second central portion, and substantially laterally aligned with the first lateral portion, and a fourth lateral portion laterally offset from the second central portion, and substantially laterally aligned with the second lateral portion, wherein the second central portion connects the third and fourth lateral portions, wherein the third and fourth lateral portions each define a ground contact surface that defines a generally T shape, and wherein the first lateral portion and the fourth lateral portion overlap or align in a longitudinal direction.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
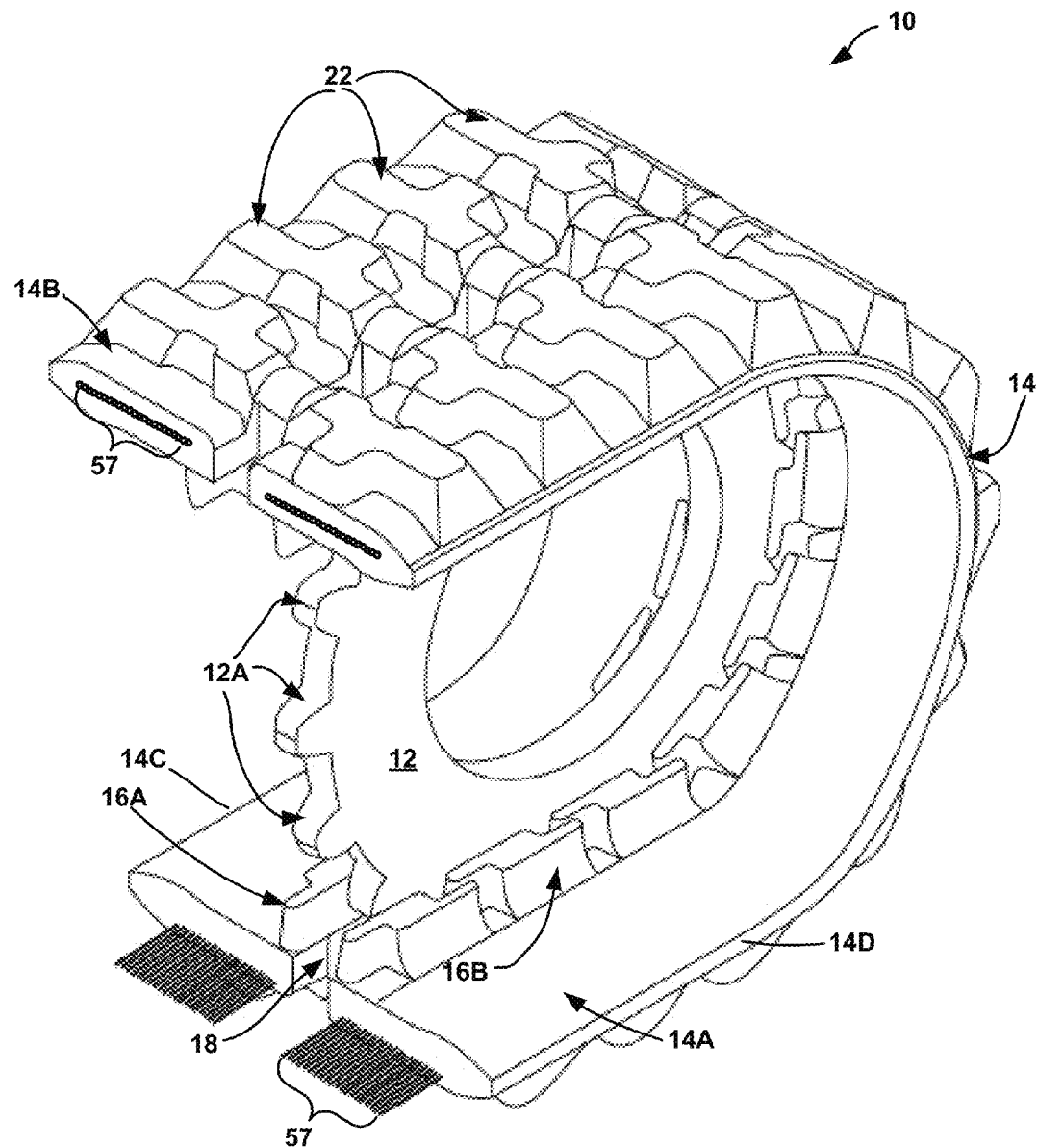
FIG. 1 is a schematic perspective view illustrating an example of an endless track mounted about a drive sprocket wheel comprising a plurality of teeth.

FIG. 1 is a schematic perspective view illustrating an example of endless track 10 mounted about drive sprocket wheel 12 comprising plurality of teeth 12A. Drive sprocket wheel 12 may be, for example, a part of a drive system of a vehicle. The drive system may also include one or more other drive sprocket wheels, such as a drive sprocket wheel that is positioned on an opposite end of endless track 10 from drive sprocket wheel 12. Drive sprocket wheel 12, which can be actuated by a drive motor, engages with endless track 10 and rotates endless track 10. As endless track 10 rotates and engages with a ground surface, a vehicle on which endless track 10 is mounted moves, depending on the direction in which endless track 10 rotates. In other examples, other drive mechanisms may be used to drive endless track 10. Endless track 10 may be used with an industrial vehicle, such as, but not limited to, an earthmoving vehicle (e.g., a skid steer loader) or an agricultural vehicle (e.g., a tractor).

In FIG. 1, a part of endless track 10 has been cut away to illustrate first side 14A and second side 14B of body 14. Second side 14B of body 14 is on an opposite side of body 14 from first side 14A. Disposed between first and second sides 14A, 14B of body 14 are reinforcing members 57, which are described in further detail below.

First side 14A defines an inner circumference of body 14 and may be configured to mount endless track 10 to a drive system of a vehicle. In the example of FIG. 1, first side 14A comprises two rows of guide portions 16A and 16B (collectively "guide portions 16") that may enable alignment and engage drive sprocket wheel 12 with endless track 10. In some examples, guide portions 16 may define channel 18 that may be sized and shaped to receive drive sprocket wheel 12. Guide portions 16 of each row may be longitudinally (or circumferentially in the case of an endless track) aligned with a corresponding guide portion 16 in the opposing row (e.g., guide portion 16A may be aligned with opposing guide portion 16B). In other examples, guide portions 16A may be arranged to partially longitudinally align or overlap with a corresponding guide portion 16B in the opposing row. In yet other examples, guide portions 16A may alternate with guide portions 16B of the opposing row such that guide portions 16 may not be longitudinally aligned with the corresponding guide portion 16 in the opposing row.

First side 14A of body 14 may also define a plurality of ribs that may be configured to engage with teeth 12A of drive sprocket wheel 12 when endless track 10 is mounted on drive sprocket wheel 12. As drive sprocket wheel 12 rotates, teeth 12A may engage with apertures defined between the plurality of ribs (e.g., apertures 54 as described in FIGS. 2A and 2B), which may rotate endless track 10. The rotation of endless track 10 may cause endless track 10 (and any vehicle on which endless track 10 is mounted) to move in a first direction (e.g., forward or backward). If drive sprocket wheel 12 is rotated in a direction opposite the first direction, then the rotation of endless track 10 may cause endless track 10 to move in a second direction (e.g., forward or backward). In some examples, a vehicle with two endless tracks 10 mounted may move in a third direction or a fourth direction (e.g., left or right) when the first endless track 10 moves in the first direction and the second endless track 10 moves in the second direction.

While drive sprocket wheel 12 is shown in the example of FIG. 1, in other examples, other drive systems may be used to support and drive endless track 10. For example, rather than engaging with a center of first side 14A of body 14, the vehicle drive system may include sprockets that engage with sidewall 14C, 14D of body 14. For example, first side 14A of body 14 may include guide portions that are adjacent to sidewall 14C, 14D of body 14, rather than substantially centered, as shown in FIG. 1.

Second side 14B of body 14 defines an outer circumference of body 14 and may be configured to engage with an exterior surface (e.g., the ground), and thus, second side 14B may be referred to as an "exterior" side of body 14. In sonic examples, body 14 with second side 14B comprising a tread pattern 22 may be configured to engage the exterior surface, which may be defined by multiple tread portions extending from a common surface.

In some examples, endless track 10 may be used on a vehicle that is used for a range of applications. In these examples, tread pattern 22 may be configured to exhibit both good traction and provide a smooth ground contact surface, which may prevent damage to delicate work surfaces (e.g., grass). In some examples, different applications may require different performance characteristics of endless track 10. For example, in landscaping applications, traction may not be necessarily as big of a concern as for construction applications, but it may be desirable for tread pattern 22 to have a design that limits damage to grassy surface conditions. In other examples, in construction applications, it may be desirable for tread pattern 22 to exhibit both relatively good traction and smooth operation on relatively uneven surfaces, but a relatively strong tread pattern 22 that may endure high speed operations. In some examples, endless track 10 comprising tread pattern 22 in accordance with the disclosure addresses the concerns of both landscaping and construction applications of endless track 10, and may be designed to be useful with both landscaping and construction vehicles. In yet other examples, endless track 10 may also be used with other applications, such as agricultural applications or other applications involving unstable ground surfaces or other relatively tough terrain environmental conditions.

Figure 2A:
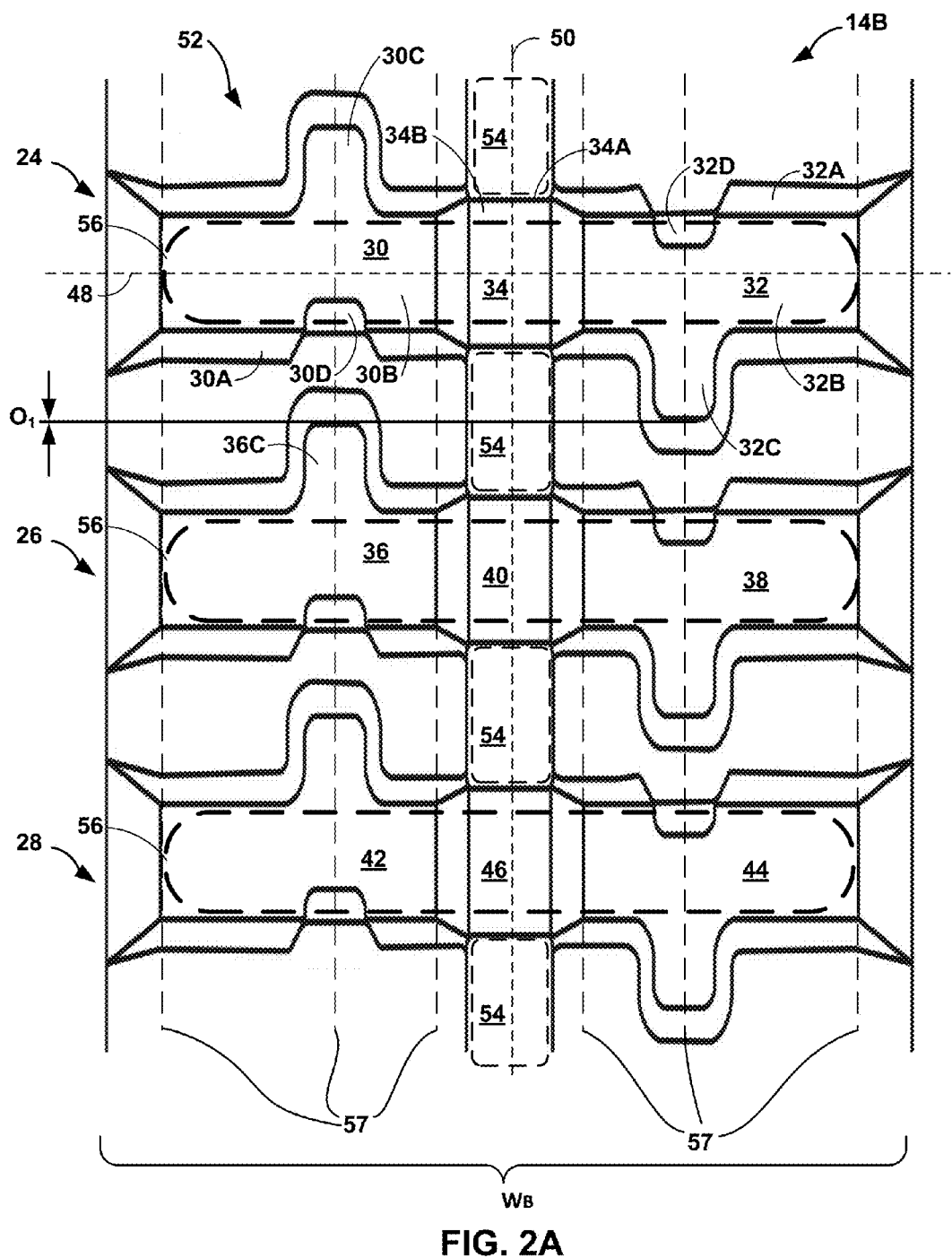
FIG. 2A is a schematic plan view of the endless track shown in FIG. 1 and illustrates an example tread pattern.

Tread pattern 22 is shown in further detail in FIGS. 2A-4. FIG. 2A is a schematic plan view of endless track 10 shown in FIG. 1 and illustrates example tread pattern 22.

In the example of FIG. 2A, tread pattern 22 includes a plurality of blocks. Tread pattern 22 may be defined by a substantially uniformly repeating pattern of blocks. In the portion of tread pattern 22 shown in FIG. 2A, tread pattern 22 includes three blocks 24, 26, and 28. However, second side 14B of body 14 may include more than the three blocks 24, 26, and 28 shown in FIG. 2A, and typically may include as many blocks as necessary to repeat along the outer circumference of body 14. Block 24 includes first lateral traction portion 30, second lateral traction portion 32, and center (or central) traction portion 34 connecting first lateral traction portion 30 and second lateral traction portion 32. Block 26 includes first lateral traction portion 36, second lateral traction portion 38, and center traction portion 40 connecting first and second lateral traction portions 36 and 38. Block 28 includes first lateral traction portion 42, second lateral traction portion 44, and center traction portion 46 connecting first and second lateral traction portions 42 and 44.

In some examples, a traction volume may be defined between adjacent blocks. Block 24, 26, and 28 may be substantially similar, such that a traction volume between adjacent blocks may also be substantially similar. In some examples, the traction volume between adjacent blocks of tread pattern 22 may be a volume equal to or greater than 26 cubic inches ($in^3$) (about 426 cubic centimeters ($cm^3$)). In the example of FIG. 2A, the traction volume may be about 29 $in^3$ (about 475 $cm^3$) between adjacent blocks 24 and 26, and about 29 $in^3$ between adjacent blocks 26 and 28. In this manner, tread pattern 22 may have greater traction than other tread patterns, such as a "C" pattern or a "Wide" pattern, with traction volumes of 19.97 $in^3$ (about 327 $cm^3$) and 25.1 $in^3$ (about 411 $cm^3$), respectively.

Because blocks 24, 26, and 28 may be substantially similar (e.g., identical or nearly identical, but with manufacturing variances), only block 24 will be described in further detail, with the understanding that the description of block 24 may be applicable to the description of blocks 26 and 28. In some examples, each traction portion 30, 32, and 34 of block 24 may define a surface that defines the outermost surface of second surface 14B (furthest from first surface 14A of body 14), and thus, define the ground contact surface of block 24. The outermost surface of each traction portion 30, 32, and 34 is shown in FIG. 2A. To aid in the description of tread pattern 22, transverse axis 48 (e.g., an axis extending in a transverse or lateral direction) and circumferential axis 50 (e.g., a longitudinal axis extending substantially along the outer circumference of body 14 or in a substantially longitudinal direction in the case of a vehicle track that does not comprise an outer circumference) are shown in FIG. 2A. Transverse axis 48 and circumferential axis 50 may be generally perpendicular to each other.

Center traction portion 34 may be substantially aligned with channel 18 (shown in FIG. 1) defined by guide portions 16 on first side 14A of body 14. In some examples, center traction portion 34 may be longitudinally aligned with both first and second traction portions 30 and 32 (e.g., center axes of portions 30, 32, 34 that extend in the transverse axis 48 are aligned along circumferential axis 50). In addition, first and second traction portions 30 and 32 are laterally offset (e.g., spaced from each other along transverse axis 48) from each other and longitudinally aligned with each other (e.g., center axes of portions 30, 32 that extend in the transverse axis 48 are aligned along circumferential axis 50). In some examples, the longitudinal alignment of traction portions 30, 32, and 34 may enable endless track 10 to have increased initial startup traction, when compared to other endless track designs.

In some examples, first and second traction portions 30 and 32 each includes a protrusion extending substantially longitudinally away from transverse axis 48, such that portions 30, 32 each defines define a T-shape traction portion (e.g., when viewed from the perspective shown in FIG. 2A). For example, in the example shown in FIG. 2A, first traction portion 30 includes first protrusion 30C extending longitudinally away from transverse axis 48, and second traction portion 32 includes second protrusion 32C extending longitudinally away in an opposite direction from transverse axis 48. As a result, as shown in FIG. 2A, portions 30, 32 may define T-shapes that face in different, opposite directions. In some examples, portions 30, 32 may each define a T-shape having curvilinear edges, as shown in FIG. 2A. In other examples, the T-shapes may have straight edges or both curvilinear and straight edges.

In some examples, protrusions 30C and 32C of first and second lateral traction portions 30 and 32, respectively, may be aligned or overlap with the protrusions of adjacent lateral traction portions of adjacent blocks in a longitudinal direction. For example, second protrusion 32C of second lateral traction portion 32 may longitudinally be aligned or overlap with protrusion 36C of lateral traction portion 36 of block 26. In this way, adjacent blocks 24, 26 may longitudinally be aligned or overlap, respectively. Blocks that are arranged such that at least one traction portion of one block longitudinally, but not laterally, aligns or overlaps with one traction portion of an adjacent block may help increase the smoothness with which endless track 10 traverses a surface. The aligned or overlapping blocks may provide a smoother ride for a passenger in the vehicle on which track 10 is mounted because the aligned or overlapping adjacent blocks define a substantially continuous ground contact surface.

The amount of longitudinal overlap between adjacent blocks 24, 26, 28 is represented in FIG. 2A by overlap distance $O_1$. In some examples, the extent of longitudinal overlap (e.g., the magnitude of overlap distance $O_1$) between protrusions of adjacent blocks 24, 26, 28 may be selected to achieve a substantially continuous ground contact surface, while still maintaining a relatively high level of traction (e.g., which may be correlated to the volume of space between adjacent blocks 24, 26, 28). In some examples, protrusions 32C, 36C of adjacent blocks may be aligned with no overlap distance (i.e., overlap distance $O_1$ is zero or nearly zero, taking into consideration manufacturing tolerances). In other examples, protrusions 32C, 36C of adjacent blocks may overlap in a longitudinal direction by an overlap distance of about 1 millimeter (mm) or less, such as less than about 0.5 mm, or less than about 0.10 mm, such as about 0.06 mm. In yet other examples, protrusions 32C, 36C of adjacent blocks may overlap by an overlap distance greater than 1 mm.

In contrast to endless track 10 including traction blocks that include longitudinally aligned or overlapping protrusions, a straight bar design traction design, which does not include longitudinally aligned or overlapping portions, may provide a relatively rough ride because the adjacent blocks are not aligned or overlapping and have a discontinuous ground contact surface. The space between each adjacent block in the straight bar design, while contributing to traction, may cause continuous bumping with the ground. In this way, tread pattern 22 may provide a smoother ride than a straight bar design because adjacent blocks 24 and 26 are in continuous contact with the ground, whereas the adjacent blocks of the straight bar design are not in continuous contact with the ground.

In some examples, the greater the extent of overlap between protrusions of adjacent blocks 24, 26, 28, the less traction endless track 10 may provide with a ground contact surface. Thus, the relatively smoothness of the ride provided by endless track 10 and the traction provided by endless track may be modified by adjusting the extent of overlap between protrusions of adjacent blocks 24, 26, 28.

As discussed above and herein, an arrangement of a block may be repeated on second side 14B of body 14 in a longitudinal direction to define tread pattern 22. Each block may be aligned or overlap with each other by an overlap distance. For example, an overlap distance of overlapping adjacent blocks may be described using first and second blocks 24 and 26. An edge of second protrusion 32C of second traction portion 32 (e.g., the edge may be defined by an edge of a ground contacting surface 32B) of first block 24 longitudinally aligned or overlaps with closest edge of protrusion 36C of traction portion 36 of second block 26 in a longitudinal direction by overlap distance $O_1$. In some examples, overlap distance $O_1$ may be about 0.01 mm to about 5 mm. For example, overlap distance $O_1$ may be about 0.04 mm or about 0.06 mm. However, in accordance with this disclosure, each block 24, 26, and 28 may overlap with an adjacent block by any suitable overlap distance $O_1$. In examples in which protrusions of adjacent blocks 24, 26, 28 are longitudinally aligned, overlap distance $O_1$ may 0 mm. The example overlap distance $O_1$ values provided herein, as well as the other dimensions provided herein, are for descriptive purposes and the present disclosure is no way limited to the dimensions provided herein.

In some examples, first and second lateral traction portions 30 and 32 may be substantially the same size (e.g., identical sizes or nearly identical sizes, but for manufacturing variances), may have substantially the same shape (e.g., identical shapes or nearly identical shapes, but for manufacturing variances), or may both be substantially the same shape and size. In other examples, first and second lateral traction portions 30 and 32 may not be substantially the same size or shape. In the example of FIG. 2A, first and second traction portions 30 and 32, respectively, have substantially the same shape, but are oriented at about 180 degrees with respect to each other.

In the example shown in FIG. 2A, first and second traction portions 30 and 32 extend from center traction portion 34 by substantially equal distances along the transverse axis 48. In other examples, first and second traction portions 30 and 32 may extend from center traction portion 34 (along transverse axis 48) by different distances. For example, a furthermost distance from center traction portion 34 to an end of first traction portion 30 adjacent to shoulder 14C may not be equal to a distance from the same point on center traction portion 34 to an end of second traction portion 32 adjacent to shoulder 14D.

In some examples, first and second traction portions 30 and 32 may each define a recess 30D and 32D, respectively, extending in a longitudinal direction towards a center line of the respective traction portion. For example, in the example shown in FIG. 2A, first traction portion 30 defines first recess 30D extending longitudinally toward a geometric center line of traction portion 30, and second traction portion 32 includes second recess 32D extending longitudinally toward a geometric center line of traction portion 32.

Recesses 30D and 32D of first and second traction portions 30 and 32, respectively, may help increase or otherwise adjust the traction volume (e.g., the volume of space) between adjacent blocks (e.g., the traction volume between blocks 24 and 26) of tread pattern 22. By adjusting the traction volume defined between the adjacent blocks, the overall traction of endless track 10 may also be adjusted. In some examples, the traction volume between the adjacent blocks may be defined at least in part by the recesses (e.g., recesses 30D and 32D) and may be used for specific applications (e.g., a first traction volume for a loose gravel application, a second traction volume for a firmer surface, and the like). In some examples, the volume of the recesses (e.g., recesses 30D and 32D) may also enable the adjacent blocks of tread pattern 22 to have a higher traction volume than the traction volume of other tread patterns, such as a "C" tread pattern or a "Wide" tread pattern.

Center traction portion 34 connects first and second traction portions 30 and 32, and may increase the traction of endless track 10 because center traction portion 34 increases the overall volume between adjacent blocks. Increasing the volume between adjacent blocks 24, 26, 28 of endless track 10 may increase the amount of dirt and other ground substances that may be trapped between adjacent blocks 24, 26, 28, which may increase the ground traction provided by endless track 10. Without the respective center traction portions, a discrete volume may not be formed between adjacent blocks 24, 26, 28, which may reduce the ground traction provided by endless track 10 because dirt and other ground substances may flow freely through the volumes between adjacent blocks 24, 26, 28.

In some examples, traction portions 30, 32, and 34 may be substantially continuous and define a single ground contact surface for engaging with an exterior surface. In some examples, the arrangement of traction portions 30, 32, and 34 may provide an asymmetrical and bidirectional tread pattern 22, which may provide substantially equal traction in both forward and backward movement of endless track 10. For example, tread pattern 22 including the first and second traction portions 30 and 32 extending in substantially opposite directions from a substantially central traction portion 34 of endless track 10 may provide generally even traction in both forward and reverse motion of endless track 10. The bidirectional tread pattern may enable endless track 10 to achieve substantially even wear of traction portions 30, 32, and 34, which may extend the life of endless track 10.

In the example of FIG. 2A, traction portions 30, 32, and 34 define respective ground contact surfaces 30B, 32B, and 34B. In some examples, ground contact surface 34B of center traction portion 34 is curvilinear and has a convexity that is projected in a direction away from first side 14A, as shown in FIG. 1. The curvilinear shape of the ground contact surface defined by center traction portion 34 may help reduce the force applied to center traction portion 34 when a rock or other relatively hard object is interfacing with ground contact surface 34B. For example, the curvilinear surface defined by center traction portion 34 may guide the rock or other relatively hard object away from center traction portion 34 and may help prevent the rock or other object from becoming lodged adjacent to center traction portion 34, which may cause the rock or other object to apply a force to center traction portion 34 that may dislodge center traction portion 34.

In addition to, or instead of, the curvilinear ground contact surface 34B, in some examples, ground contact surface 34B may be recessed relative to ground contact surfaces 30B, 32B of first and second traction portions 30, 32, respectively. As shown in FIG. 1, for example, ground contact surface 34B defined by center traction portion 34 does not extend as far away from first side 14A of body 14 as ground contact surfaces 30B, 32B defined by first and second traction portions 30, 32, respectively.

A recessed curvilinear ground contact surface 34B of central traction portion 34 may help reduce the stress from impacts with a surface that endless track 10 may experience due to the relatively high level of traction that tread pattern 22 provides to endless track 10. In addition, recessed curvilinear ground contact surface 34B of central traction portion 34 may also minimize the forces applied by the ground to center traction portion 34. In some examples, recessed curvilinear ground contact surface 34B may not be recessed, but, rather, may extend from ground contact surfaces 309, 32B substantially the same extent that traction protrusions 30, 32, 34 extend from ground contact surfaces 30B, 32B. A recessed ground contact surface 34B of central traction portion 34 may reduce the traction between endless track 10 and the ground compared to examples in which ground contact surface 34B of central traction portion 34 is not recessed relative to the other ground contact surfaces 30B, 32 of block 24.

In the example of FIG. 2A, traction portions 30 and 32 extend from common surface 52. For example, first traction portion 30 may extend from common surface 52 to define walls 30A that extend from common surface 52 to ground contact surface 30B. Second traction portion 32 may similarly define wall 32A that extends between common surface 52 and ground contact surface 32B, and central traction portion 34 may define wall 34A that extends from beneath common surface 52 to ground contact surface 34B. In some examples, central traction portion 34 may define wall 34A that extends between common surface 52 and ground contact surface 34B. Ground contact surfaces 30B, 32B, and 34B may define a radially outmost surface of body 14. As discussed above, in some examples, ground contact surface 349 of central traction portion 34 may be recessed relative to ground contact surfaces 30B, 32B, such that it does not protrude as far from common surface 52 as ground contact surfaces 30B, 32B. Thus, in some examples, ground contact surface 34B of central traction portion 34 may have a different elevation relative to ground contact surfaces 30B, 32B. However, in some examples, ground contact surfaces 30B, 32B, and 34B may extend from common surface 52 by the same amount, such that, prior to use and wear of endless track 10, ground contact surfaces 30B, 32B, and 34B of traction portions 30, 32, 34, respectively, are substantially aligned. An example of such a configuration is described below with reference to FIGS. 8-11.

In the example of FIG. 2A, apertures 54 (shown in phantom lines) may be sized and shaped to receive teeth 12A of drive sprocket wheel 12 as described in FIG. 1. Apertures 54 may be defined by guide portions 16 within channel 18 on first side 14A of body 14 (shown in FIG. 1). In some examples, apertures 54 may be disposed between blocks 24, 26, and 28. In the example of FIG. 2A, apertures 54 may overlap with traction portions of each block the longitudinal direction (e.g., along circumferential axis 50). In other examples, apertures 54 and a center traction portion of each block may alternate, such that apertures 54 do not longitudinally overlap with any traction portions.

In order to increase the strength of endless track 10, support cores 56 (shown in phantom lines) may be coupled to body 14. Support cores 56 may also be referred to as "links" of endless track 10. Support cores 56 may be embedded in body 14 or attached to one or both sides 14A, 14B of body 14. For example, body 14 may comprise multiple layers of material and support cores 56 may be positioned between the multiple layers of material. In other examples, body 14 may be molded, and support cores 56 may be introduced into the molding material prior to curing the material to form body 14. In yet other examples, support cores 56 may be adhered to body 14 using any suitable adhesive.

Support cores 56 may be made of any suitable material and in any suitable configuration. For example, support cores 56 may be formed from steel, iron, or any other suitable material or combination thereof. In some examples, support cores 56 may have two sections, where a first section may be configured to engage with the drive sprocket teeth 12A (FIG. 1) to move endless track 10, and a second section may be the remainder of the body of support core 56. In some examples, the two sections of support core 56 may be integrated into a single support core. In other examples, the two sections of support core 56 may not be integrated into a single support core. For example, support core 56 may be a single, integral component, and may be manufactured by hot forging using metal rods, casting from metal, or any other suitable manufacturing process. In some examples, support cores 56 may have a rectangular shape with rounded corners (from the plan view shown in FIG. 2A) as shown in FIG. 2A. In other examples, support cores 56 may be any suitable configuration.

In the example of FIG. 2A, one support core 56 may correspond to each block 24, 26, and 28. For example, each block 24, 26, and 28 may be centered over one support core 56. In other examples, multiple support cores 56 may correspond to each block 24, 26, and 28 or one support core 56 may span two or more blocks 24, 26, and 28.

Center traction portion 34 may provide the primary engagement surface between endless track 10 and the ground because of the central position of center traction portion 34 on body 14 and alignment with drive sprocket wheel 12 (via apertures 54). In some examples, by placing center traction portion 34 to at least partially over one support core 56, support core 56 may enable at least the center portion of tread pattern 22 to remain relatively stiff. In other examples, some degree of flexibility along transverse axis 48 may be desirable for tread pattern 22 in order to allow tread pattern 22 to accommodate varying ground conditions. In these examples, body 14 may exhibit some integrity to provide stability to endless track 10. In this manner, support core 56 may provide integrity to endless track 10, but may be positioned within body 14 such that center traction portion 34 may still exhibit some degree of flexibility to enable endless track 10 to conform to different ground surfaces. In the example of FIG. 2A, support core 56 may also be aligned with a part of first and second traction portions 30, 32, which may increase the integrity of at least those portions of traction portions 30, 32.

Second side 14B of body 14 and traction portions 30, 32, and 34 may receive a high impact force when teeth 12A of drive sprocket wheel 12 engage with apertures 54 and drive sprocket wheel 12 contacts portions of body 14 comprising support cores 56. In these examples, if block 24 is located between drive sprocket wheel 12 of the vehicle and the ground, the high impact force may be received by block 24 because block 24 must support the weight of the vehicle. In the example of FIG. 2A, the impact force from drive sprocket wheel 12 and the weight of the vehicle may be distributed over ground contact surfaces 30B, 32B, and 34B of traction portions 30, 32, and 34, respectively, and over at least one support core 56. In some examples, the distribution of force may be at least partially attributable to the interconnection of traction portions 30, 32, and 34 to define a substantially continuous ground contact surface, and the longitudinal alignment of traction portions 30, 32, and 34 with support core 56. In some examples, traction portions of each block 24, 26, and 28 and support cores 56 in tread pattern 22 may spreading the impact force laterally, which may reduce the occurrence of cracking in any areas of tread pattern 22 that experience an unbalanced impact force. In some examples, center traction portions of each block 24, 26, and 28 may each have a curvilinear surface, which may also reduce the impact force and the occurrence of cracking in any areas of tread pattern 22. For instance, uneven mounting of endless track 10 on a vehicle may cause an unbalanced impact force and uneven wear of tread pattern 22, among other things.

Endless track 10 may include multiple reinforcing members 57 coupled to body 14 to further increase the strength of endless track 10. For example, reinforcing members 57 may extend in a substantially longitudinal direction along circumferential axis 50. In some examples, reinforcing members 57 may be similar to support cores 56, such that reinforcing members 57 may be embedded in body 14 by placing reinforcing members 57 between layers in body 14 or embedding reinforcing member 57 in body 14 during a molding process. In the example of FIG. 2A, six reinforcing members 57 are symmetrically arranged about circumferential axis 50, however, endless track 10 may include any suitable number of reinforcing members 57 in any suitable arrangement. In some examples, body 14 may include about 28 to about 80 reinforcing members 57. For example, the number of reinforcing members 57 may be selected based on the width $W_B$ of body 14 and the desired application of endless track 10.

Reinforcing members 57 may be a flexible steel cord (or cable) and may have a minimum tensile strength of about 400 kilograms. In some examples, the ends of each reinforcing member 57 may be coupled together. For example, the ends of each reinforcing member 57 may be adjacent to each other, which may be referred to as a jointless connection. In other examples, the ends of each reinforcing member 57 may overlap in the longitudinal, lateral, and/or radial direction, which may be substantially perpendicular to the circumferential and transverse axes 50, 48, respectively, and may be referred to as a jointed connection.

Body 14 of endless track 10 may be defined by a single molded piece of material or may be an assembly of interconnected parts that are coupled or bonded together to define an endless track. In some examples, body 14 of endless track 10 may be composed at least in part of a natural rubber, a synthetic rubber, combinations thereof, or other elastomeric materials. Examples of suitable synthetic rubbers may include, but not limited to, styrene butadiene rubber and polybutadiene rubber, or any other suitable synthetic rubber.

In some examples, body 14 may also include other components to enable desired material properties. For example, body 14 may include, but not limited to, reinforcing agents, vulcanization accelerators, antiozonants, antioxidants, vulcanizing agents, retarders, rubber softeners, tackifiers, and any other suitable component to enable the desired material properties in some examples, the exact composition of body 14 may depend upon various factors, including, but not limited to, a particular application and/or the range of applications of endless track 10.

In some examples, body 14 may be elastomeric, which may provide better maneuverability of a vehicle, better ride quality, and increased traction as compared to steel endless tracks. In some examples, the rubber of first surface 14A (including guide portions 16) may have a hardness in a range about 63 durometer to about 83 durometer. For example, a rubber of first surface 14A may have a hardness of about 73 durometer. In some examples, the rubber of second surface 14B (including blocks 24, 26, and 28) may have a hardness in a range of about 53 durometer to about 73 durometer. For example, a rubber of second surface 14B may have a hardness of about 63 durometer. In some examples, blocks 24, 26, and 28 may be softer than first side 14A of body 14 because performance of endless track 10 may be optimized when traction portions 30-44 are able to conform to a range of ground conditions. In these examples, guide portions 16 on first side 14A may be relatively rigid as compared to traction portions 30-44 to provide sufficient engagement with drive sprocket wheel 12.

Body 14 may have any suitable width $W_B$, which may depend upon the particular application of endless track 10 and the vehicle with which endless track 10 is used. In some examples, endless track 10 may be used with a skid steer loader, excavator, carrier, dumper, multi-terrain loader, compact track loader, agricultural machine, stump cutter machine, a trenching machine, or any other suitable machine. In these examples, body 14 may have a width $W_B$ (measured in a direction along transverse axis 48) of about 150 millimeters (mm) to about 915 mm. For example, width $W_0$ may be about 250 mm. In other examples, width $W_B$ may be about 200 mm, 230 mm, 300 mm, 320 mm, 400 mm, and 450 mm.

Figure 2B:
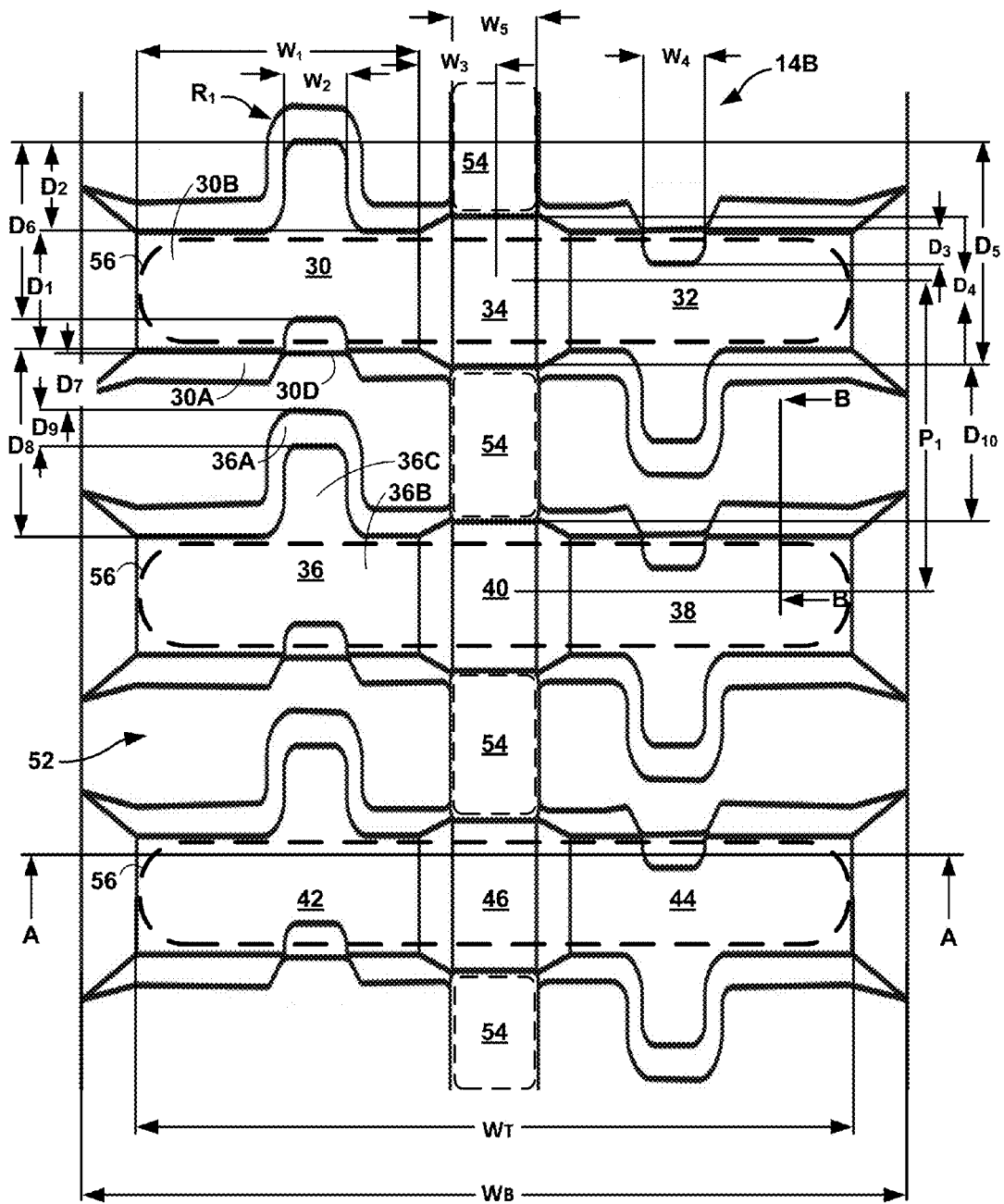
FIG. 2B is a schematic plan view of the endless track shown in FIG. 1 and illustrates example dimensions of the tread pattern shown in FIG. 2A.

FIG. 2B is a schematic plan view of endless track 10 shown in FIG. 1 and illustrates example dimensions of tread pattern 22 shown in FIG. 2A. Reinforcing members 57 have been removed from FIG. 2B for clarity of illustration. Again, the dimensions described with respect to traction portions 30, 32, and 34 of the first block 24 may also be applicable to traction portions 36, 38, and 40, respectively, of second block 26 and traction portions 42, 44, and 46, respectively, of third block 28.

In some examples, width $W_T$ of the ground contact surfaces 309, 32B, and 34B of first block 24 may be about 75 percent (%) to about 100% of width $W_B$ of body 14. In the example of FIG. 2B, a total width $W_T$ of the ground contact surfaces 309, 32B, and 34B of first block 24 may be about 88.56% of width $W_B$ of body 14. In some examples, total width $W_T$ may be between 200 mm and 230 mm. For example, total width $W_T$ may be about 221.4 mm. Each block in tread pattern 22 may distribute the impact force from drive sprocket wheel 12 and any other drive wheels of a vehicle drive system substantially over the width $W_B$ of body 14 because the total width $W_T$ of each block is a majority of the width $W_B$ of body 14. In some examples, tread pattern 22 may enable the distribution of impact forces over a relatively large percentage (e.g., 75% or greater) of the width $W_B$ of body 14, which may enable a relatively smooth vehicle operation. In some examples, tread pattern 22 may also provide relatively good traction while minimizing damage to fragile ground surfaces, such as grass.

In some examples, ground contact surfaces 30B and 32B of first and second traction portions 30 and 32, respectively, each may have an overall width $W_1$ of about 30% to about 50% of width $W_T$ of ground contact surfaces 30B, 32B, and 34B. For example, width $W_1$ may be about 40% of width $W_T$. In some examples, width $W_1$ may be about 89.15 mm. In some examples, ground contact surfaces of protrusions 30C and 32C of first and second traction portions 30 and 32, respectively, each may have a protrusion width $W_2$ of about 9% to about 15% of width $W_T$ of ground contact surfaces 30B, 32B, and 34B. For example, width $W_2$ may be about 12% of width $W_T$. In some examples, width $W_2$ may be about 30 mm. In some examples, ground contact surfaces 30B and 32B of first and second traction portions 30 and 32, each may have a recess width $W_4$ of about 10% to about 20% of width $W_T$ of ground contact surfaces 30B, 32B, and 34B. For example, recess width $W_4$ may be about 16% of width $W_T$. In some examples, recess width $W_4$ may be about 18 mm to 37 mm. In some examples, ground contact surface 34B of center traction portion 34 may have an overall width $W_5$ of about 10% to 15% of width $W_T$. For example, width $W_5$ may be about 11% of width $W_T$. In some examples, width $W_5$ may be about 24 mm.

A center of each support core 56 may be separated from a center of an adjacent support core by pitch $P_1$. Pitch $P_1$ may, in some examples, also represent the pitch of blocks 24, 26, 28 of endless track 10, which may be referred to as a "track pitch." Pitch $P_1$ of support cores and/or blocks 24, 26, 28 may affect the ground contact surface provided by endless track 10; the greater the pitch, the greater the ground contact surface. In some examples, pitch $P_1$ may be about 52.5 mm to about 100 mm. For example, pitch $P_1$ may be about 72 mm. Pitch $P_1$ may depend on the type of application endless track 10 is used for, as well as the width $W_B$ of body 14.

As described above, first traction portion 30 defines wall 30A and ground contact surface 30B. In the example of FIG. 2B, distance $D_1$ of ground contact surface 30B may be about 20 mm to about 40 mm. For example, distance $D_1$ may be about 24.4 mm. Ground contact surface 30B may also have a first length (e.g., a protrusion length of protrusion 30C that may be measured substantially perpendicular to width $W_B$ of body 14) from about $D_1$ to about $D_2$. In some examples, $D_2$ may be about 20 mm to about 45 mm. For example, $D_2$ may be about 23.80 mm. $D_2$ may depend on pitch $P_1$ between each support core 56. In some examples, distance $D_2$ may be about 20% to about 65% of pitch $P_1$. For example, distance $D_2$ may be about 33.06% of pitch $P_1$. Ground contact surface 30B may also have a second length (e.g., a recess length of recess 30D that may be measured substantially perpendicular to width $W_B$ of body 14) distance $D_3$. In some examples, distance $D_3$ may be about 5 mm to 12 min. For example, distance $D_3$ may be about 10 mm.

A lateral and longitudinal center of center traction portion 34 may be separated from a closest edge of ground contact surface 30B of first traction portion 30 by width $W_3$. Width $W_3$ may depend upon the width $W_1$ of the ground contact surfaces 30B and 32B of adjacent traction portions 30 and 32, respectively, because center traction portion 34 bridges traction portions 30 and 32. For example, width $W_3$ may be determined after selecting a desired width $W_T$ of the overall ground contact surface of first block 24 and subtracting the width $W_1$ of each of the ground contact surfaces 30B and 32B and dividing the remaining width in half. In some examples, the overall width $W_1$ of the ground contact surface of first block 24 (as well as the other blocks of tread pattern 22) may be selected prior to selecting the individual dimensions of each traction portion 30, 32, and 34 because the desired performance of endless track 10 may be generally achieved based on overall width $W_1$ of the ground contact surface of first block 24. In some examples, width $W_3$ may be about 10 mm to about 30 mm. For example, width $W_3$ may be about 21.55 mm. In some examples, second traction portion 32 may have substantially similar dimensions as first traction portion 30. In the example of FIGS. 2A-2B, second traction portion 32 may have the same shape and dimensions as first traction portion 30, but rotated about 180 degrees.

Center traction portion 34 may have a maximum length measured along circumferential axis 50 of about distance $D_4$. In some examples, distance $D_4$ may be about 48% to about 70% of pitch $P_1$ between each support core 56. For example, distance $D_4$ may be about 52% of pitch $P_1$. In some examples, distance $D_4$ may be about 35 mm. Distance $D_5$ may be measured from an edge of ground contact surface 30B of first traction portion 30 to a furthest edge of ground contact surface 34B of center traction portion 34. In some examples, distance $D_5$ may be about 50% to about 70% of pitch $P_1$ between each support core 56. For example, distance $D_5$ may be about 62% of pitch $P_1$. In some examples, distance $D_5$ may be about 51 mm.

Protrusion 30C and recess 30D may each have a length measured along circumferential axis 50 of distance $D_6$. Distance $D_6$ may be measured from an edge of recess 30D of first traction portion 30 to a furthest edge of protrusion 30C of lateral traction portion 30. In some examples, distance $D_6$ may be about 35 mm to about 45 mm. For example, distance $D_6$ may be about 43 mm.

Distances between blocks 24 and 26 may also be measured in direction along circumferential axis 50. Distance $D_7$ may be measured from an edge of recess 30D of first traction portion 30 to a closest edge of wall 36A of lateral traction portion 36 of block 26. In some examples, distance $D_7$ may be about 10 mm to about 25 mm. For example, distance $D_7$ may be about 15 mm. Distance $D_8$ may be measured from an edge of ground contact surface 30B of first traction portion 30 to a closest edge of ground contact surface 36B of lateral traction portion 36 of block 26. In some examples, distance $D_8$ may be about 45 mm to about 55 mm. For example, distance $D_8$ may be about 47 mm. Distance $D_9$ may be measured from an edge of wall 36A to a closest edge of ground contact surface 36B of first traction portion 36 of block 26. In some examples, distance $D_9$ may be about 5 mm to about 10 mm. For example, distance $D_9$ may be about 7 mm.

Apertures 54 may have a maximum length measured along circumferential axis 50 of about distance $D_{10}$. Distance $D_{10}$ may be measured from an edge of ground contact surface 34B of center traction portion 34 to a closest edge of ground contact surface 40B of center traction portion 40 of block 26. In some examples, distance $D_{10}$ may be about 25 mm to about 55 mm. For example, distance $D_{10}$ may be about 40 mm.

Protrusion 30C of first lateral portion 30 may have a rounded portion of wall 30A with radius $R_1$. Radius $R_1$ may be measured around an edge of wall 30A along protrusion 30C of first lateral traction portion 30. In some examples, radius $R_1$ may be about 10 mm.

Figure 3:
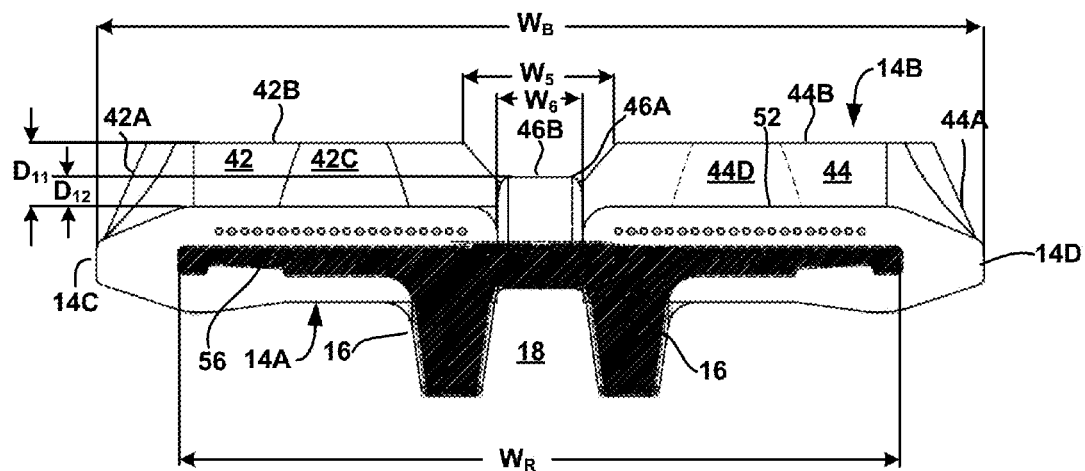
FIG. 3 is a schematic cross-sectional end view of the body of the endless track shown in FIGS. 2A and 2B, where the cross-section is taken along line A-A in FIG. 2B.

FIG. 3 is a schematic cross-sectional end view of body 14 of endless track 10 shown in FIGS. 2A and 2B, where the cross-section is taken along line A-A in FIG. 2B. Hence, the view of FIG. 3 looks down a longitudinal length of endless track 10. Cross-sectional view of block 28 is substantially similar to the cross-sectional view of blocks 24, 26. For example, first lateral traction portion 42, second lateral traction portion 44, and center traction portion 46 may be similar or identical to first lateral traction portion 30, second lateral traction portion 32, and center traction portion 34 of block 24.

In the example of FIG. 3, first lateral traction portion 42 includes wall 42A, ground contact surface 42B, and protrusion 42C, second lateral traction portion 44 includes wall 44A, ground contact surface 44B, and recess 44D, and center traction portion 46 includes wall 46A and ground contact surface 46B.

Guide portions 16 extend from first side 14A of body 14 to define channel 18, which may define a plurality of apertures 54 (as described with respect to FIGS. 2A and 2B) that are configured to receive teeth 12A of drive sprocket wheel 12 (FIG. 1). Support core 56 may be embedded in body 14 and includes projections that extend into guide portions 16, thereby increasing the rigidity of guide portions 16. In the example shown in FIG. 3, support core 56 may extend across a large percentage of width $W_B$ of body 14. In some examples, support core 56 may have a width $W_R$ of about 160 mm, while body 14 may have a width $W_B$ (measured from sidewall 14C to side wall 14D of body 14) of about 180 mm.

In some applications of endless track 10, traction portions 42, 44, and 46 (as well as the other traction portions of tread pattern 22) may be substantially devoid of support core 56 in order to provide some degree of flexibility when endless track 10 is mounted on drive sprocket wheel 12. The flexibility of the traction portions 42, 44, and 4 may enable endless track 10 to conform to uneven surfaces.

Other example dimensions of one example of body 14 are shown in FIG. 3. For example, first and second lateral traction portions 42 and 44 extend distance $D_{11}$ from common surface 52 of second surface 14B. In other words, traction portions 42 and 44 may have an elevation $D_{11}$ from common surface 52 of second surface 14B. In some examples, distance $D_{11}$ may be about 5 mm to about 30 mm from common surface 52. For example, distance $D_{11}$ may be about 18 mm from common surface 52. In some examples, center traction portion 46 may be extend distance $D_{12}$ from common surface 52 of second surface 14B, which may be less than distance $D_{11}$. In other words, center traction portion 46 may be recessed relative to lateral traction portions 42 and 44. In some examples, distance $D_{12}$ may be about 5 mm to about 25 mm from common surface 52. For example, distance $D_{12}$ may about 9 mm from common surface 52.

Ground contact surfaces 42B and 44B of first and second lateral traction portions 42 and 44, respectively, of block 28 are separated by width $W_5$. In some examples, width $W_5$ may be about 25 mm to about 50 mm. For example, width $W_5$ may be about 43 mm. Wall 42A of first lateral traction portion 42 of block 28 may be separated from a closest wall 44A of second lateral traction portion 44 of block 28 by width $W_6$. In some examples, width $W_6$ may be about 12 mm to about 32 mm. For example, width $W_6$ may be about 24 mm.

Figure 4:
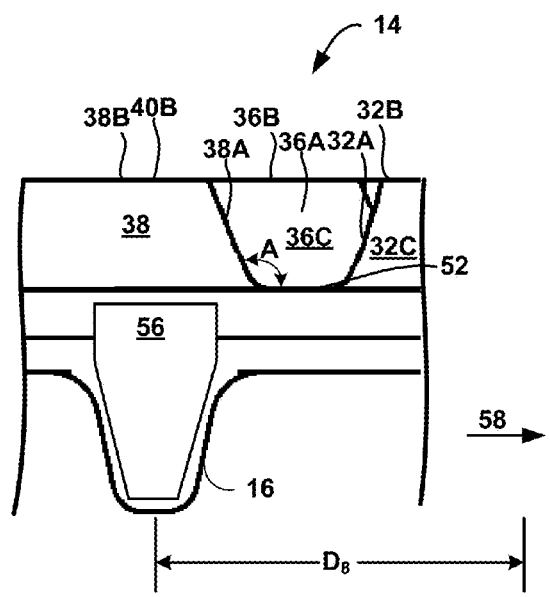
FIG. 4 is a schematic cross-sectional side view of the body of the endless track shown in FIGS. 2A and 2B, where the cross-section is taken along line B-B in FIG. 2B.

FIG. 4 is a schematic cross-sectional side view of body 14 of endless track 10 shown in FIGS. 2A and 2B, where the cross-section is taken along line B-B in FIG. 2B. Line B-B is substantially perpendicular to line A-A in FIG. 2B. When viewing the cross-sectional view taken within lateral traction portion 38 of second block 26 and lateral traction portion 32 of first block 24, protrusion 36C of traction portion 36 and protrusion 32C of traction portion 32 of an adjacent block 24 are shown due to the protrusions of circumferentially overlapping nature of adjacent blocks 24 and 26. Wall 38A of lateral traction portion 38 may be oriented at an obtuse angle A relative to common surface 52 and extends between common surface 52 and ground contact surface 38B of lateral traction portion 38.

In the example of FIG. 4, support cores 56 may extend substantially into a respective guide portion 16. In some examples, guide portions 16 may be separated from adjacent guide portions 16 in a longitudinal direction (indicated by arrow 58) by a distance $D_8$, which may be measured from a center of one guide portion 16 to a center of an adjacent guide portion 16. In some examples, distance $D_8$ may be about 62 mm to about 82 mm. For example, distance $D_8$ may be about 72 mm. Distance $D_8$ may be adjusted depending on the distance separating each block 24, 26, and 28 and the size of drive sprocket wheel 12. For example, distance $D_8$ between guide portions 16 may be selected to accommodate the size of drive sprocket wheel 12 because distance $D_8$ between guide portions 16 affects the distance separating apertures 54 (FIG. 2A), which may be configured to engage with teeth 12A of drive sprocket wheel 12. In other examples, distance $D_8$ may be adjusted depending on the desired traction volume to be defined between adjacent blocks. In some examples, distance $D_8$ may be determined based on a traction volume equal to or greater than abut 26 in$^3$ (about 426 cubic centimeters (cm$^3$)). For example, distance $D_8$ may be based on a traction volume about 29 in$^3$ (about 475 cm$^3$).

A vehicle track in accordance with the disclosure may also comprise other tread patterns defined by a substantially repeating pattern of blocks comprising two lateral traction portions separated by and connected by a central traction portion, the lateral traction portions being longitudinally aligned with each other, and including protrusions that longitudinally extend in substantially opposite directions, where the pattern is repeated in a longitudinal direction. In some examples, the lateral traction portions and their respective protrusions may define a "T" shape or a variation thereof.

Figure 5:
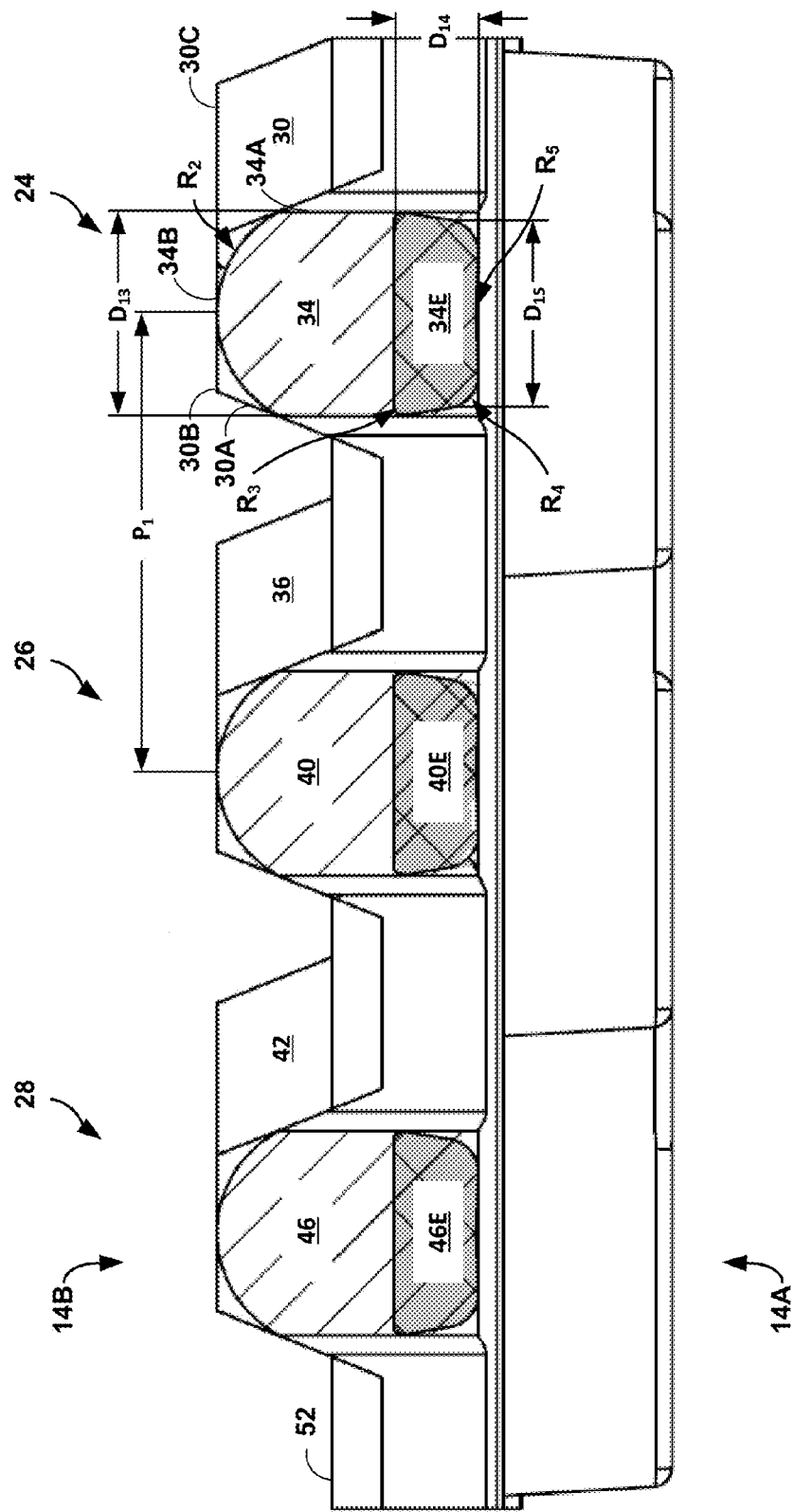
FIG. 5 is a schematic cross-sectional side view of the body of the endless track shown in FIGS. 2A and 2B, where the cross-section is taken along the circumferential axis in FIG. 2A.

FIG. 5 is a schematic cross-sectional side view of body 14 of endless track 10 shown in FIGS. 2A and 2B, where the cross-section is taken along circumferential axis 50 in FIG. 2A. As shown in FIG. 5, center traction portion 34 defines a curvilinear ground contact surface 34B. In the example of FIG. 5, center traction portions 34, 40, and 46 may include center traction support 34E, 40E, and 46E, respectively. Center traction support 34E may be substantially similar to center traction supports 40E and 46E of center traction portions 40 and 46, respectively.

Curvilinear ground contact surface 34B may have a length of distance $D_{13}$. In some examples, distance $D_{13}$ may be about 25 mm to about 40 mm. For example, distance $D_{13}$ may be about 32 mm. In the example of FIG. 5, curvilinear ground contact surface 34B has radius of curvature $R_2$ with respect to common surface 52. In some examples, radius of curvature $R_2$ may be coincident with the ground contact surfaces of the lateral traction portions. For example, in the example of FIG. 5, radius of curvature $R_2$ may be coincident with ground contact surface 30B. In some examples, radius of curvature $R_2$ may be based on the width of an iron core e.g., the width of one of reinforcing members 57 as described in FIG. 1) and may, for example, bridge the respective traction portions 30, 40, 42 across the respective drive sprocket engagement area. In some examples, radius of curvature $R_2$ may be about 10 mm to 25 mm. For example, radius of curvature $R_2$ may be about 18 mm.

Center traction support 34E may be embedded in body 14 and extends into center traction portion 34, thereby increasing the rigidity of center traction portion 34. Center traction support 34E has a length measured along circumferential axis 50 of about distance $D_{15}$. In some examples, distance $D_{15}$ may be about 20 mm to about 35 mm. For example, distance $D_{15}$ may be about 28 min. In addition, as shown in FIG. 5, center traction support 34E may extend a distance $D_{14}$ into center traction portion 34. In some examples, distance $D_{14}$ may be about 5 mm to about 15 mm. For example, distance $D_{14}$ may be about 13 mm.

In some examples, center traction support 34E has a curvilinear profile. For example, in the example of FIG. 5, center traction support 34E defines a curvilinear corner that is positioned to be closest to common surface 52, the curvilinear edge having a radius of curvature $R_3$ with respect to common surface 52. In some examples, radius of curvature $R_3$ may provide a rounded edge to reduce stress on endless track 10. In some examples, radius of curvature $R_3$ may be about 1 mm to about 3 mm. For example, radius of curvature $R_3$ may be about 2.5 mm. Center traction support 34E may also define a curvilinear edge that is positioned to be furthest from common surface 52, the curvilinear edge having a radius of curvature $R_4$ with respect to common surface 52. In some examples, radius of curvature $R_4$ may be based on the radius of sprocket tooth 12A, e.g., may match a radius of curvature of the sprocket tooth in order to engage well with sprocket 12. In some examples, $R_4$ may be about 3 mm to about 7 mm. For example, $R_1$ may be about 5.1 mm. In the example of FIG. 5, center traction support 34E may also define a curvilinear recess between the corners furthest from common surface 52, the recess having a radius of curvature $R_5$ in cross-section with respect to common surface 52. In some examples, radius of curvature $R_5$ may be based on the outer diameter of sprocket 12 to provider proper engagement with sprocket 12. In some examples, $R_5$ may be about 150 mm to about 175 mm. For example, $R_5$ may be about 168.1 mm.

In some applications of endless track 10, center traction support 34E (as well as the other center traction supports of tread pattern 22) may provide some degree of flexibility in addition to an increase in rigidity when endless track 10 is mounted on drive sprocket wheel 12. The flexibility of center traction support 34E may enable endless track to increase the distribution of forces applied to center traction portion 34, which may increase the lifespan of endless track 10. For example, center traction support 34E may increase the lifespan of endless track 10 by minimizing the cracking of center traction support 34.

Figure 6:
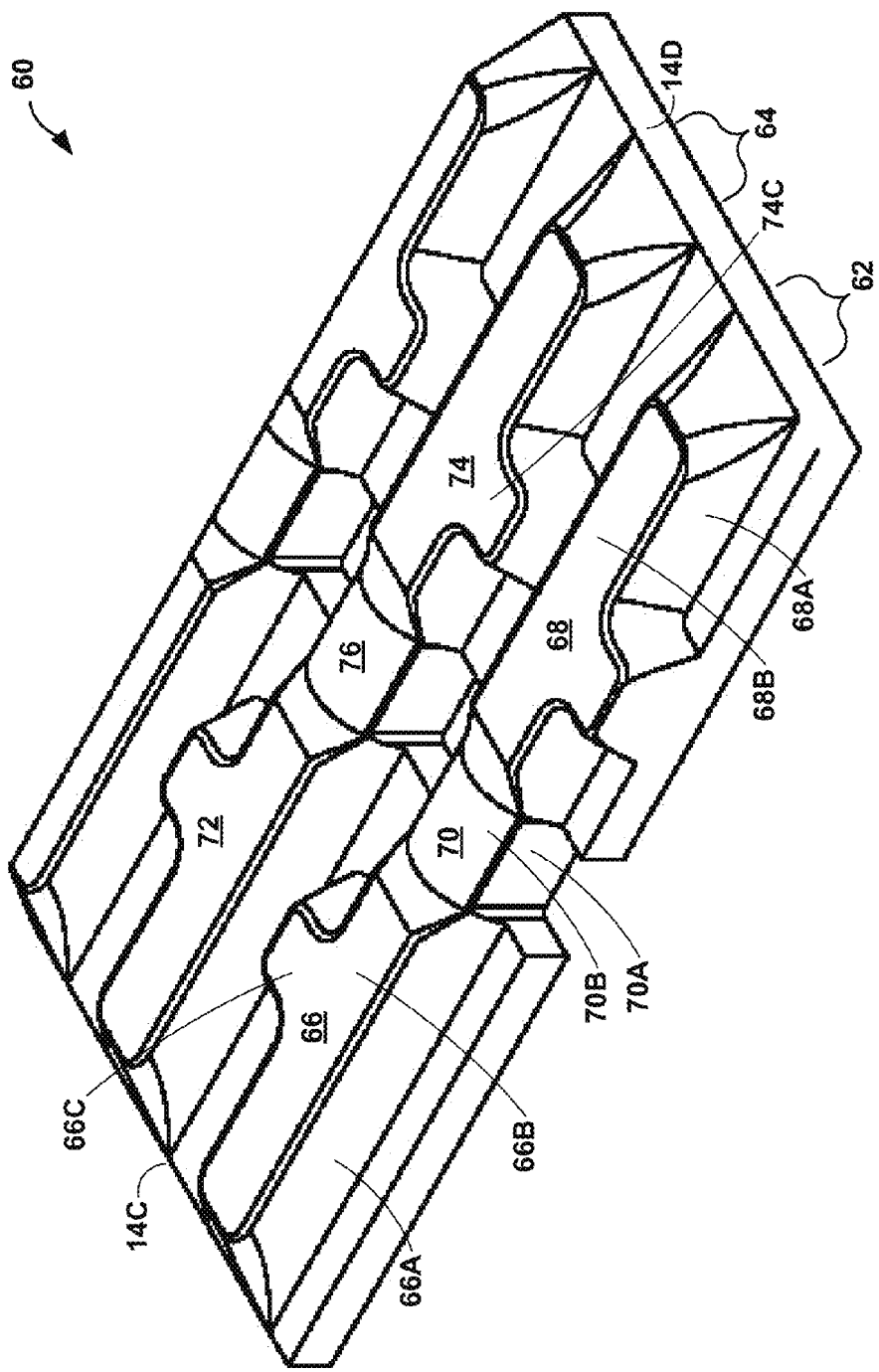
FIG. 6 is an isometric view of an endless track illustrating another example tread pattern.

FIG. 6 is an isometric view of endless track 10 illustrating another example tread pattern 60. Tread pattern 60 may be similar to tread pattern 22, except that lateral portions (e.g., first and second lateral portions 66 and 68) do not define recesses that extend toward a geometric center of the respective lateral portion. In some examples, tread pattern 60 may be used instead of tread pattern 22. In these examples, the absence of the recess may decrease the traction volume between adjacent blocks of tread 60 when compared to the traction volume of tread pattern 22. However, tread 60 may still provide sufficient traction for certain applications. For example, protrusions 66C and 74C of traction portions 66 and 72, respectively, may be aligned or overlap by an overlap distance greater than zero, which may define the substantially continuous ground contact surface between blocks 62 and 64 of tread 60.

Figure 7:
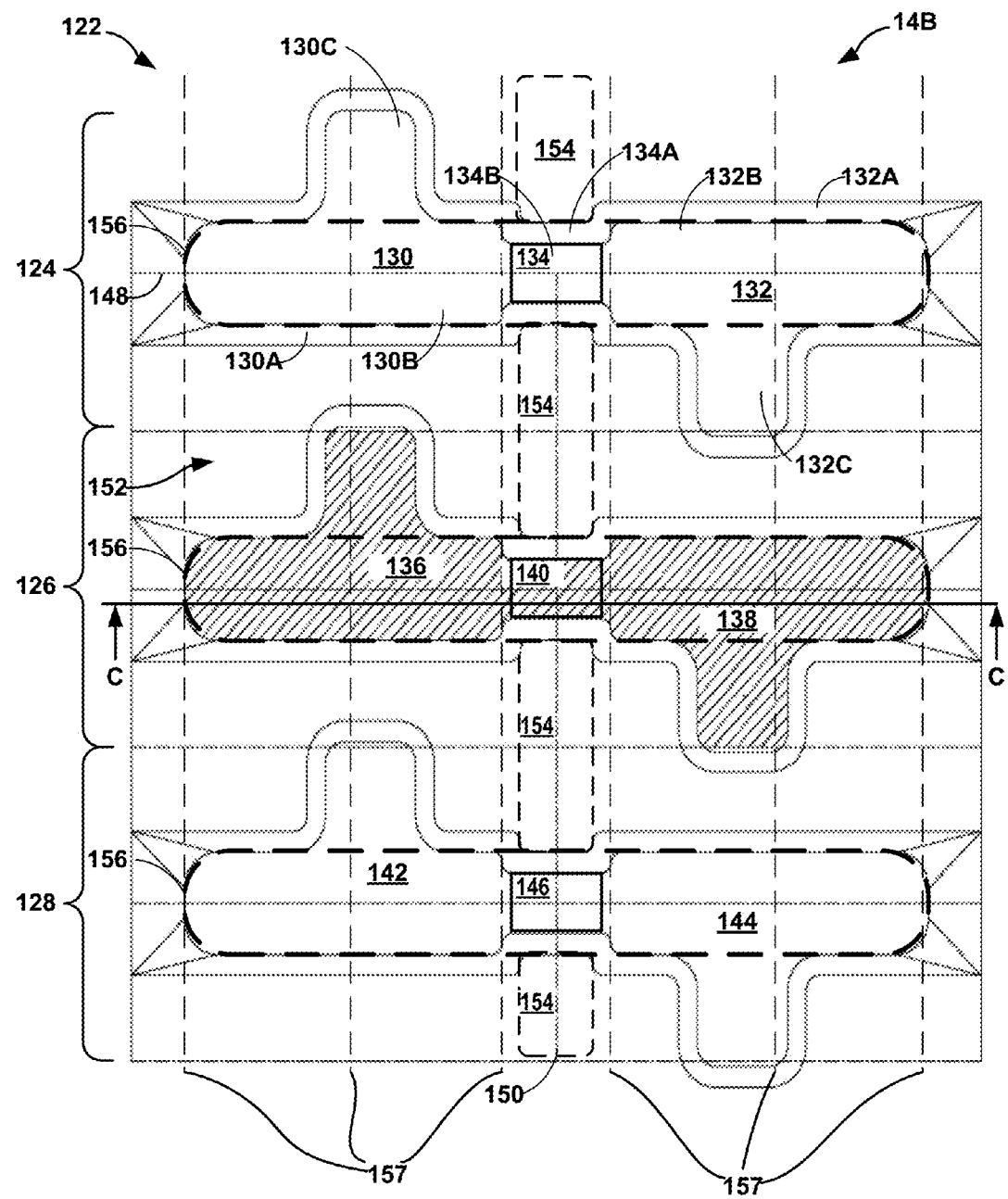
FIG. 7 is a schematic plan view of the second side of the endless track shown in FIG. 6.
Figure 8:
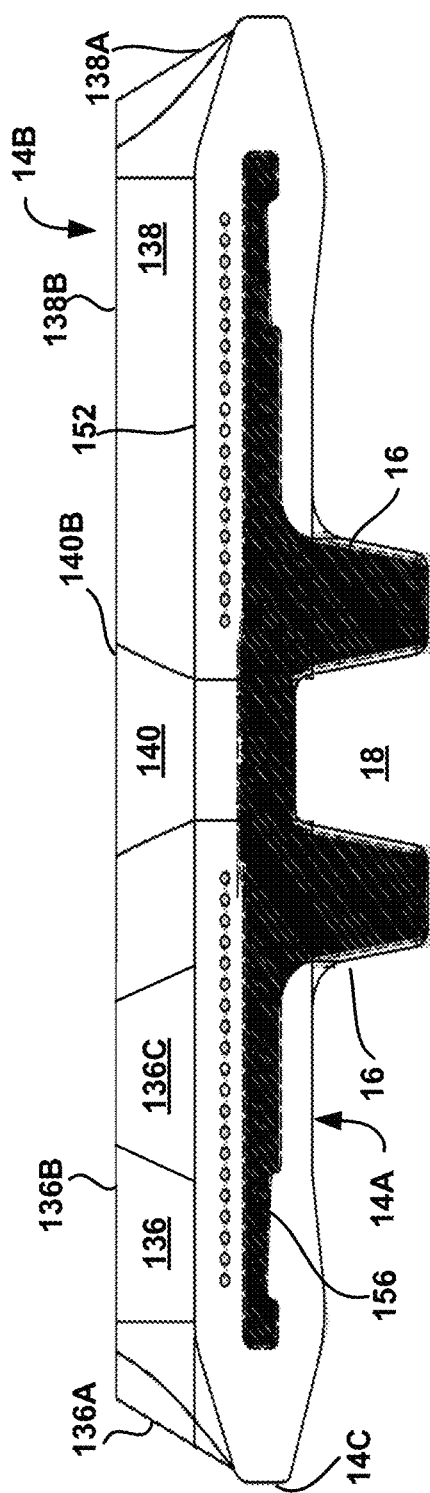
FIG. 8 is a schematic cross-sectional end view of the body of the endless track shown in FIGS. 6 and 7, where the cross-section is taken along line C-C in FIG. 7.

FIG. 7 is a schematic plan view of second side 14B of endless track 10 shown in FIG. 6. FIG. 8 is a schematic cross-sectional end view of body 14 of endless track 10 shown in FIGS. 6 and 7, where the cross-section is taken along line C-C FIG. 7. In the example shown in FIGS. 7 and 8, tread pattern 122, blocks 124-128, traction portions 130-146, transverse axis 148, circumferential axis 150, common surface 152, apertures 154, support cores 156, and reinforcing members 157 may be similar to tread pattern 22, blocks 24-28, traction portions 30-46, transverse axis 48, circumferential axis 50, common surface 52, apertures 54, support cores 56, and reinforcing members 57 described with respect to FIG. 2A, except that lateral traction portions are not rounded in profile and do not define recesses (e.g., as shown in FIG. 6) and ground contact surfaces of center traction portions 134, 140, 146 are not curvilinear and recessed relative to ground contact surfaces of the respective lateral traction portions 130, 132, 136, 138, 142, 144.

As shown in FIG. 7, ground contact surfaces of each block (e.g., surfaces 136B, 138B, and 140B of block 126) extend from a common surface 152, and may have substantially the same elevation relative to common surface 152. Thus, the ground contact surfaces are aligned when track 10 is in an unworn state, e.g., prior to use of track 10. In other examples, traction portions 130, 132, and 134 may extend from one or more surfaces that have different elevations. In these examples, ground contact surface 130B, 1329, and 134B of each traction portion 130, 132, and 134, respectively, may still be aligned (when track 10 is in an unworn state) and may still be substantially continuous. The absence of the recessed curvilinear center portion of each block in tread pattern 122 may increase the traction volume between adjacent blocks of tread pattern 122 when compared to the traction volume of tread patterns 22 and 60; increasing the traction volume may increase the traction provided by an endless track including tread pattern 122.

Figure 9A:
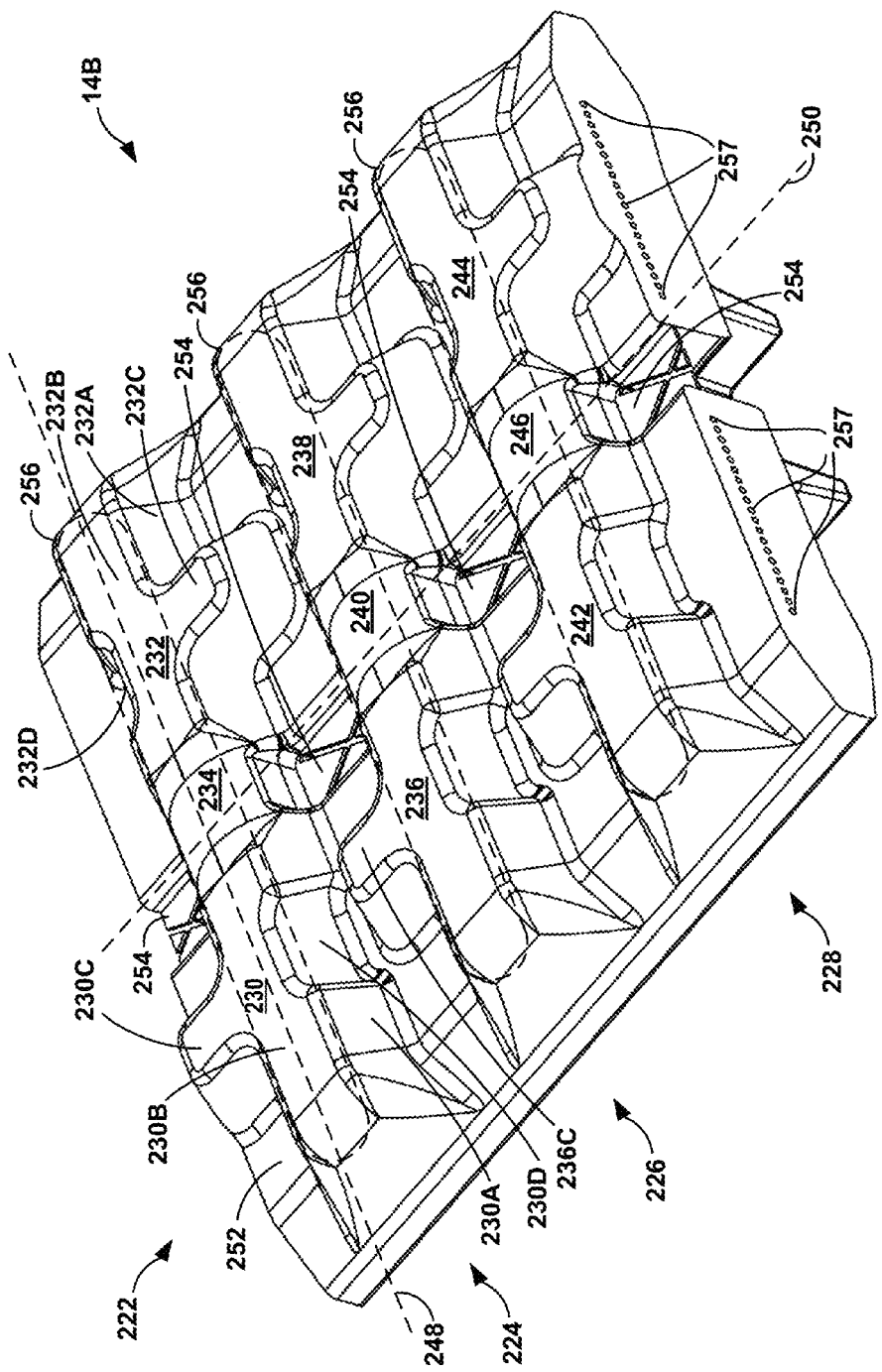
FIGS. 9A and 9B are isometric views of an endless track illustrating another example tread pattern.
Figure 9B:
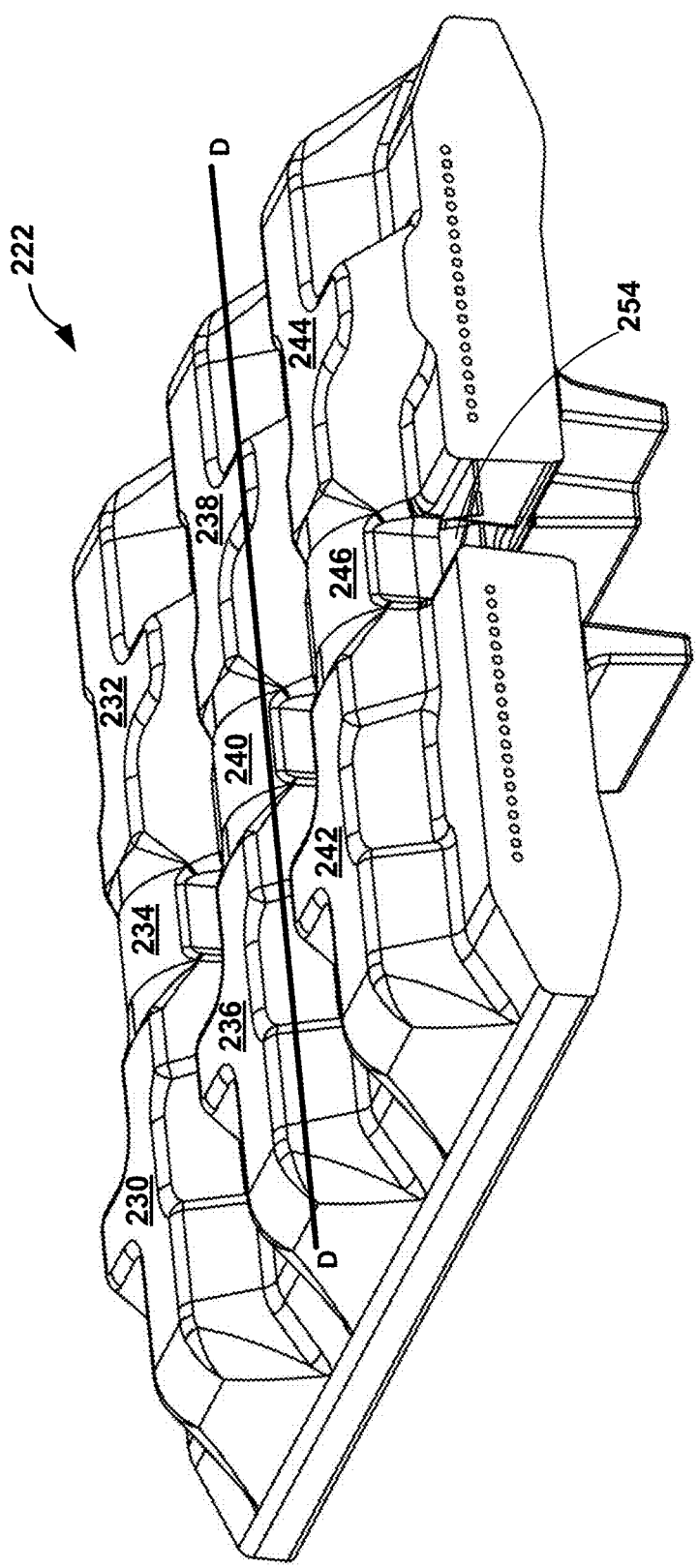
Figure 10:
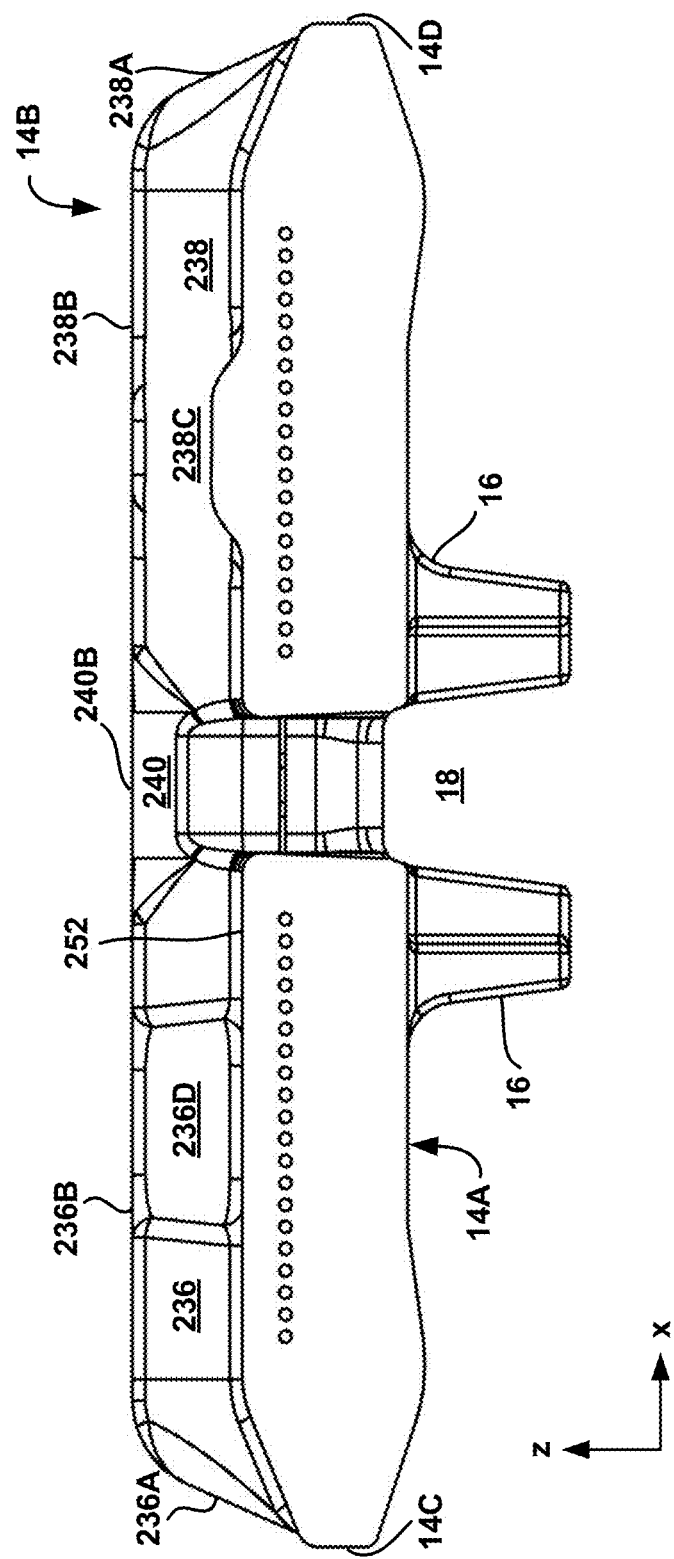
FIG. 10 is a schematic cross-sectional end view of the body of the endless track shown in FIGS. 9A and 9B, where the cross-section is taken along line D-D in FIG. 9B.

FIGS. 9A and 9B are isometric views of endless track 10 illustrating another example tread pattern 222. FIG. 10 is a schematic cross-sectional end view of the body of endless track 10 shown in FIGS. 9A and 9B, where the cross-section is taken along line D-D in FIG. 9B. In the example shown in FIGS. 9A-10, tread pattern 222, blocks 224-228, traction portions 230-246, transverse axis 248, circumferential axis 250, common surface 252, apertures 254, support cores 256, and reinforcing members 257 may be similar to tread pattern 22, blocks 24-28, traction portions 30-46, transverse axis 48, circumferential axis 50, common surface 52, apertures 54, support cores 56, and reinforcing members 57 described with respect to FIG. 2A. However, in the example shown in FIGS. 9A-10, the edges of the ground contact surfaces of lateral traction portions 230, 232, 236, 238, 242, 244 may be rounded in profile, e.g., in the x-z plane (orthogonal x- and z-axes are shown in FIG. 10 to aid the description), near the walls (e.g., walls 236A and 238A as shown in FIG. 10) above sidewalk 14C and 14D. In this example, lateral traction portions 230, 232, 236, 238, 242, 244 also define recesses e.g., recess 236D as shown in FIG. 10, and the ground contact surfaces of center traction portions 234, 240, 246 may be curvilinear, but not recessed relative to the ground contact surfaces of the respective lateral traction portions 230, 232, 236, 238, 242, 244.

As shown in FIG. 10, ground contact surfaces of each block (e.g., surfaces 236B, 238B, and 240B of block 226) extend from one or more surfaces that have different elevations, including common surface 252, and may have substantially the same elevation relative to the one or more surfaces. In these examples, ground contact surface 236B, 238B, and 240B of each traction portion 236, 238, and 240, respectively, may still be aligned (when track 10 is in an unworn state) and may still be substantially continuous. In other examples, traction portions 236, 238, and 240 may extend from common surface 252, and may have substantially the same elevation relative to common surface 252. Thus, the ground contact surfaces are aligned when track 10 is in an unworn state, e.g., prior to use of track 10.

In some examples, tread pattern 222 may be used instead of tread patterns 22, 60, and 122. In these examples, the absence of the recessed center portion of each block in tread pattern 222 may increase the traction volume between adjacent blocks of tread pattern 222 when compared to the traction volume of tread pattern 22.

Figure 11:
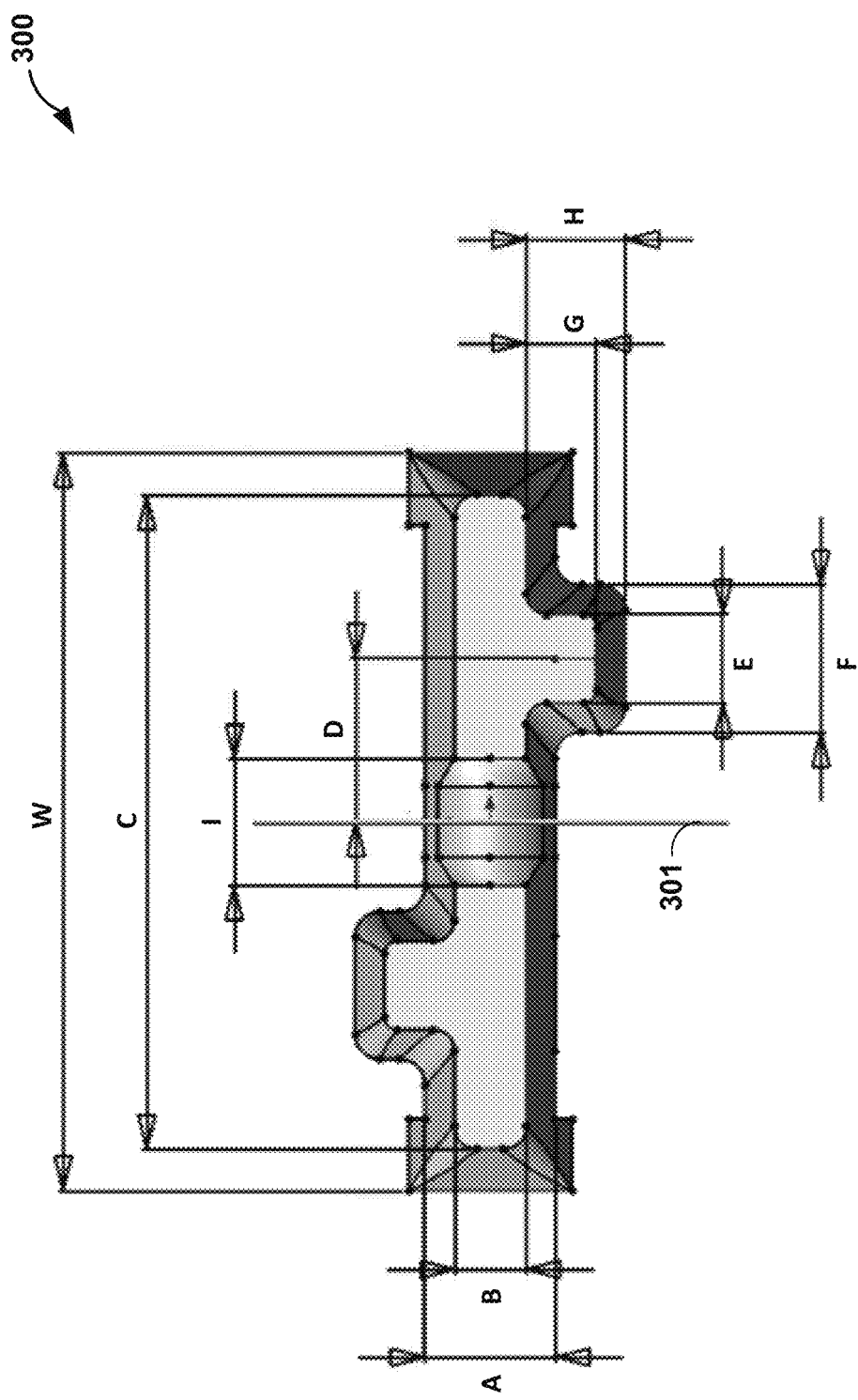
FIG. 11 is a schematic plan view of the tread pattern of FIG. 7 illustrating an example design formula for a block with dimensions.

FIG. 11 is a schematic plan view of tread pattern 122 of FIG. 7 illustrating an example design formula for block 300 with dimensions. Example dimensions A-H of block 300 are shown in Table 1. P is the track pitch of endless track 10, W is the track width of endless track 10, and ST is the sprocket thickness of endless track 10.

TABLE 1

Dimensions of Block 300

| Dimensions | Description | Formula |
|---|---|---|
| A | Tread Bottom Length | "P" x 60-65% |
| B | Tread Top Length | "A" x 55% |
| C | Tread Top Width | "W" x 85-90% |
| D | Protrusion Location from Center Line 301 | "C" x 25% |
| E | Protrusion Top Width | "C" x 13-14% |
| F | Protrusion Bottom Width | "E" x 60% |
| G | Protrusion Top Length | "P" x 33% |
| H | Protrusion Bottom Length | "G" x 139-141% |
| I | Center Tread Bridge Width | "ST" x 197-200% |

In Table 1, dimension A is the tread bottom length of block 300. In some examples, dimension A may be 60% to 65% of the track pitch of endless track 10. In Table 1, dimension B is the tread top length of block 300. In some examples, dimension B may be 55% of dimension A. In Table 1, dimension C is the tread top width of block 300. In some examples, dimension C may be 85% to 90% of the track width of endless track 10. In Table 1, dimension D is the protrusion location from center line 301 of block 300. In some examples, dimension D may be 25% of dimension C. In Table 1, dimension E is the protrusion top width of block 300. In some examples, dimension E may be 13% to 14% of dimension C. In Table 1, dimension F is the protrusion bottom width of block 300. In some examples, dimension F may be 60% of dimension E. In Table 1, dimension G is the protrusion top length of block 300. In some examples, dimension G may be 33% of the track pitch of endless track 10. In Table 1, dimension H is the protrusion bottom length of block 300. In some examples, dimension H may be 139% to 141% of dimension G. In Table 1, dimension I is the center tread bridge width of block 300. In some examples, dimension I may be 197% to 200% of the sprocket thickness of endless track 10.

Various examples of the disclosure have been described. These and other examples are within the scope of the following claims.

What is claimed is:

1. A vehicle track comprising:
a first side configured to mount to a drive system of a vehicle; and
a second side opposite the first side and defining a tread pattern comprising:
a first block comprising:
a first central portion;
a first lateral portion laterally offset from the first central portion;
a second lateral portion laterally offset from both the first central portion and the first lateral portion, wherein the first central portion connects the first and second lateral portions, and wherein the first and second lateral portions are longitudinally aligned, an end of the first lateral portion furthest from the first central portion being longitudinally aligned with an end of the second lateral portion furthest from the first central portion; and
a second block longitudinally offset from the first block comprising:
a second central portion substantially laterally aligned with the first central portion;
a third lateral portion laterally offset from the second central portion, and substantially laterally aligned with the first lateral portion; and
a fourth lateral portion laterally offset from the second central portion, and substantially laterally aligned with the second lateral portion, wherein the second central portion connects the third and fourth lateral portions, wherein the third and fourth lateral portions are longitudinally aligned, and wherein the first lateral portion and the fourth lateral portion overlap or align in a longitudinal direction.

2. The track of claim 1, wherein the first central portion, the first lateral portion, and the second lateral portion are longitudinally aligned along a circumferential axis, and wherein the second central portion, the third lateral portion, and the fourth lateral portion are longitudinally aligned along the circumferential axis.

3. The track of claim 1, wherein each lateral portion comprises a protrusion extending substantially longitudinally away from a transverse axis, and wherein the protrusion of the first lateral portion and the protrusion of the fourth lateral portion overlap or align in the longitudinal direction along a circumferential axis.

4. The track of claim 1, wherein the first and second central portions are each substantially centered relative to a transverse axis of the first and second blocks for engagement with a drive wheel of the drive system, the first and second central portions defining a space therebetween configured to receive a sprocket.

5. The track of claim 1, wherein first and second central portions each define a curvilinear surface, and wherein a convexity of the curvilinear surface is projected in a direction away from the first side.

6. The track of claim 1, wherein the first side comprises a plurality of guide portions defining a channel configured to engage with one or more drive sprockets of a drive system, wherein the first central portion is substantially centered with the channel.

7. The track of claim 1, wherein the first and second blocks define a substantially continuous ground contact surface, and wherein the first, second, third, and fourth lateral portions each define a ground contact surface that defines a generally T shape.

8. The track of claim 1, further comprising a plurality of support cores located between the first and second sides of the track, and wherein the plurality of support cores comprises a first support core corresponding to the first block, at least a portion of the first support core being substantially centered with the first central portion.

9. The track of claim 1, further comprising a plurality of reinforcing members extending substantially longitudinally across the track, and wherein the reinforcing members are embedded in the track.

10. The track of claim 1, wherein the first central portion defines a first surface and a second surface extending between the first surface and a common surface of the second side of the track, the first lateral portion defines a third surface and a fourth surface extending between the third surface and the common surface of the second side, and the second lateral portion defines a fifth surface and a sixth surface extending between the fifth surface and the common surface of the second side, and wherein the fourth and sixth surfaces are each oriented at an obtuse angle with respect to the common surface of the second side of the track.

11. The track of claim 1, wherein the first central portion defines a first surface and a second surface extending between the first surface and a common surface of the second side of the track, the first lateral portion defines a third surface and a fourth surface extending between the third surface and the common surface of the second side, and the second lateral portion defines a fifth surface and a sixth surface extending between the fifth surface and the common surface of the second side, and wherein the first surface is recessed from the third and sixth surfaces.

12. The track of claim 1, wherein the first and second lateral portions have substantially similar shapes, the second lateral portion being oriented at about 180 degrees relative to the first lateral portion.

13. The track of claim 1, wherein the second block is longitudinally offset along a circumferential axis from the first block to define a traction volume, wherein the traction volume is equal to or greater than 26 in$^3$.

14. A system comprising:
a drive sprocket; and
an endless track coupled to the drive sprocket and defining a tread pattern comprising:
a first block comprising:
a first central portion;
a first lateral portion laterally offset from the first central portion;
a second lateral portion laterally offset from both the first central portion and the first lateral portion, wherein the first central portion connects the first and second lateral portions, and wherein the first and second lateral portions are longitudinally aligned, an end of the first lateral portion furthest from the first central portion being longitudinally aligned with an end of the second lateral portion furthest from the first central portion; and
a second block longitudinally offset from the first block comprising:
a second central portion substantially laterally aligned with the first central portion;
a third lateral portion laterally offset from the second central portion, and substantially laterally aligned with the first lateral portion; and
a fourth lateral portion laterally offset from the second central portion, and substantially laterally aligned with the second lateral portion, wherein the second central portion connects the third and fourth lateral portions, wherein the third and fourth lateral portions are longitudinally aligned, and wherein the first lateral portion and the fourth lateral portion overlap or align in a longitudinal direction.

15. The system of claim 14, wherein each lateral portion comprises a protrusion extending substantially longitudinally away from a transverse axis, and wherein the protrusions of the first lateral portion and the fourth lateral portion overlap or align in the longitudinal direction along a circumferential axis.

16. The system of claim 14, further comprising a plurality of support cores, wherein the first and second blocks each correspond to only one support core of the plurality of support cores.

17. The system of claim 14, wherein first and second central portions each defines a curvilinear surface, and wherein a convexity of the curvilinear surface is projected in a direction away from the first side.

18. The system of claim 14, wherein the first and second lateral portions define a ground contact surface that defines a generally T-shape, and wherein the first and second lateral portions define a substantially continuous ground contact surface of the track.

19. The system of claim 14, wherein the second block is longitudinally offset along a circumferential axis from the first block to define a traction volume, wherein the traction volume is equal to or greater than 26 in$^3$.

20. A vehicle track comprising:
a first side configured to mount to a drive system of a vehicle; and
a second side opposite the first side and defining a tread pattern comprising:
a first block comprising:
a first central portion;
a first lateral portion laterally offset from the first central portion;
a second lateral portion laterally offset from both the first central portion and the first lateral portion, wherein the first central portion connects the first and second lateral portions, and wherein the first and second lateral portions each define a ground contact surface that defines a generally T shape; and
a second block longitudinally offset from the first block comprising:
a second central portion substantially laterally aligned with the first central portion;
a third lateral portion laterally offset from the second central portion, and substantially laterally aligned with the first lateral portion; and
a fourth lateral portion laterally offset from the second central portion, and substantially laterally aligned with the second lateral portion, wherein the second central portion connects the third and fourth lateral portions, wherein the third and fourth lateral portions each define a ground contact surface that defines a generally T shape, and wherein the first lateral portion and the fourth lateral portion overlap or align in a longitudinal direction.

21. The track of claim 1, wherein the first and second lateral portions each define a ground contact surface, and wherein the ends of the first and second lateral portions furthest from the first central portion are ends of the respective ground contact surfaces.

* * * * *

UNITED STATES PATENT AND TRADEMARK OFFICE
CERTIFICATE OF CORRECTION

PATENT NO. : 9,855,985 B2  
APPLICATION NO. : 14/736632  
DATED : January 2, 2018  
INVENTOR(S) : Woo Young Jee, Dennis H. Jee and Jay Lee It is certified that error appears in the above-identified patent and that said Letters Patent is hereby corrected as shown below:

In the Specification

Column 4, Line 52: Replace "In sonic" with --In some--

Column 4, Line 55: Replace "multiple tread portions" with --multiple traction portions--

Column 8, Line 56: Replace "tread pattern" with --tread pattern 22--

Column 9, Line 28: Replace "surfaces 309," with --surfaces 30B,--

Column 9, Line 50: Replace "surface 349" with --surface 34B--

Column 10, Line 3: Replace "each block the longitudinal direction" with --each block in the longitudinal direction--

Column 12, Line 40: Replace "$W_0$ may be about 250mm" with --$W_B$ may be about 250 mm--

Column 12, Line 53: Replace "surfaces 309," with --surfaces 30B,--

Column 12, Line 56: Replace "surfaces 309," with --surfaces 30B,--

Column 17, Line 31: Replace "For example $R_1$ may be" with --$R_4$ may be--

Column 18, Line 27: Replace "1329" with --132B--

Column 18, Line 55: Replace "sidewalk 14C" with --sidewalls 14C--

Signed and Sealed this  
Thirtieth Day of October, 2018

Andrei Iancu  
*Director of the United States Patent and Trademark Office*